United States Patent
Jung et al.

(10) Patent No.: US 8,752,166 B2
(45) Date of Patent: *Jun. 10, 2014

(54) SECURITY-ACTIVATED OPERATIONAL COMPONENTS

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 606 days.

This patent is subject to a terminal disclaimer.

(21) Appl. No.: 12/287,704

(22) Filed: Oct. 9, 2008

(65) Prior Publication Data

US 2010/0031374 A1 Feb. 4, 2010

Related U.S. Application Data

(63) Continuation-in-part of application No. 12/005,162, filed on Dec. 21, 2007, and a continuation-in-part of application No. 12/012,504, filed on Jan. 31, 2008, and a continuation-in-part of application No. 12/079,921, filed on Mar. 27, 2008.

(51) Int. Cl.
*G06F 21/00* (2013.01)
*G06F 19/00* (2011.01)
*H04L 9/00* (2006.01)

(52) U.S. Cl.
USPC ........ 726/21; 726/1; 726/30; 700/95; 700/97; 700/117; 700/245; 705/59; 705/310

(58) Field of Classification Search
USPC ......... 726/1, 21, 30, 2–4; 713/1, 182; 700/97, 700/108, 109, 213, 245, 95, 117; 707/705; 705/59, 310
See application file for complete search history.

(56) References Cited

U.S. PATENT DOCUMENTS

| | | | |
|---|---|---|---|
| 5,204,055 A | 4/1993 | Sachs et al. | |
| 5,644,493 A * | 7/1997 | Motai et al. | 700/96 |
| 5,762,125 A | 6/1998 | Mastrorio | |
| 5,892,900 A | 4/1999 | Ginter et al. | |
| 6,170,060 B1 | 1/2001 | Mott et al. | |
| 6,207,876 B1 | 3/2001 | Kellems et al. | |
| 6,438,457 B1 | 8/2002 | Yokoo et al. | |
| 6,458,595 B1 | 10/2002 | Selinfreund | |

(Continued)

OTHER PUBLICATIONS

U.S. Appl. No. 12/287,719, Jung et al.

(Continued)

*Primary Examiner* — Philip Chea
*Assistant Examiner* — Shanto M Abedin
(74) *Attorney, Agent, or Firm* — Suiter Swantz pc llo

(57) ABSTRACT

Various methods and systems include exemplary implementations for a security-activated operational component. Possible embodiments include but are not limited to obtaining access to an object data file configured to implement various functional operation regarding one or more objects; verifying validity of an authorization code associated with the object data file; and controlling operation of the operational component to enable or prevent its activation pursuant to the authorization code in accordance with one or more predetermined conditions.

47 Claims, 16 Drawing Sheets

(56) References Cited

U.S. PATENT DOCUMENTS

| | | |
|---|---|---|
| 6,499,026 B1 | 12/2002 | Rivette et al. |
| 6,539,283 B2 | 3/2003 | Takagi |
| 6,560,511 B1 | 5/2003 | Yokoo et al. |
| 6,584,376 B1 | 6/2003 | Van Kommer |
| 6,637,013 B1 | 10/2003 | Li |
| 6,801,822 B1 | 10/2004 | Fujiwara et al. |
| 6,830,643 B1* | 12/2004 | Hayes ................ 156/241 |
| 6,859,782 B2 | 2/2005 | Harshaw |
| 6,973,576 B2 | 12/2005 | Giobbi |
| 6,976,163 B1* | 12/2005 | Hind et al. ............ 713/156 |
| 7,013,190 B2 | 3/2006 | Fujieda |
| 7,017,043 B1 | 3/2006 | Potkonjak |
| 7,082,399 B2 | 7/2006 | Utsumi |
| 7,099,742 B2 | 8/2006 | Tajima et al. |
| 7,111,258 B2 | 9/2006 | Kato et al. |
| 7,111,321 B1* | 9/2006 | Watts et al. .............. 726/2 |
| 7,120,932 B2 | 10/2006 | Lockhart et al. |
| 7,203,966 B2 | 4/2007 | Abburi et al. |
| 7,209,900 B2 | 4/2007 | Hunter et al. |
| 7,212,574 B2 | 5/2007 | Abrams, Jr. et al. |
| 7,213,157 B2 | 5/2007 | Dariel |
| 7,296,015 B2 | 11/2007 | Poltorak |
| 7,337,218 B2 | 2/2008 | Arnold |
| 7,341,410 B2 | 3/2008 | Hill et al. |
| 7,349,758 B2 | 3/2008 | Miro et al. |
| 7,367,059 B2* | 4/2008 | Hurst et al. ............ 726/26 |
| 7,430,762 B2 | 9/2008 | Klinefelter et al. |
| 7,474,932 B2 | 1/2009 | Geng |
| 7,493,596 B2 | 2/2009 | Atkin et al. |
| 7,793,353 B2 | 9/2010 | Klinefelter et al. |
| 7,831,517 B1 | 11/2010 | Vijay et al. |
| 7,904,187 B2 | 3/2011 | Hoffberg et al. |
| 7,941,845 B2 | 5/2011 | Brunet et al. |
| 7,957,824 B2 | 6/2011 | Boronvinskih et al. |
| 8,065,741 B1 | 11/2011 | Coblentz et al. |
| 2001/0025225 A1 | 9/2001 | Ota et al. |
| 2002/0035450 A1 | 3/2002 | Thackston |
| 2002/0040290 A1 | 4/2002 | Walacavage et al. |
| 2002/0040291 A1 | 4/2002 | Walacavage et al. |
| 2002/0064759 A1 | 5/2002 | Durbin et al. |
| 2002/0072821 A1 | 6/2002 | Baker |
| 2002/0076682 A1 | 6/2002 | Herman et al. |
| 2002/0099473 A1 | 7/2002 | Amadeo et al. |
| 2002/0138745 A1* | 9/2002 | Cognigni et al. ......... 713/189 |
| 2002/0199123 A1 | 12/2002 | McIntyre et al. |
| 2003/0023337 A1* | 1/2003 | Godfrey et al. ......... 700/109 |
| 2003/0033041 A1 | 2/2003 | Richey |
| 2003/0036945 A1 | 2/2003 | Del Vecchio et al. |
| 2003/0069658 A1 | 4/2003 | Yamazaki |
| 2003/0095665 A1 | 5/2003 | Wheeler et al. |
| 2003/0176939 A1* | 9/2003 | Yoshida et al. ......... 700/109 |
| 2003/0217275 A1 | 11/2003 | Bentley et al. |
| 2003/0224823 A1* | 12/2003 | Hurst et al. ............ 455/558 |
| 2003/0226030 A1 | 12/2003 | Hurst et al. |
| 2004/0030901 A1 | 2/2004 | Wheeler et al. |
| 2004/0044901 A1 | 3/2004 | Serkowski et al. |
| 2004/0054907 A1 | 3/2004 | Chateau et al. |
| 2004/0084520 A1* | 5/2004 | Muehl et al. ............ 235/376 |
| 2004/0093516 A1* | 5/2004 | Hornbeek et al. ......... 713/201 |
| 2004/0098281 A1* | 5/2004 | Chien et al. ............. 705/1 |
| 2004/0236876 A1 | 11/2004 | Kondratiev et al. |
| 2005/0080799 A1 | 4/2005 | Harnden et al. |
| 2005/0097332 A1 | 5/2005 | Imai |
| 2005/0239445 A1 | 10/2005 | Karaoguz et al. |
| 2005/0289072 A1* | 12/2005 | Sabharwal ............. 705/59 |
| 2006/0026672 A1 | 2/2006 | Braun |
| 2006/0036570 A1* | 2/2006 | Schaefer et al. ........... 707/1 |
| 2006/0050634 A1 | 3/2006 | Gous |
| 2006/0053478 A1 | 3/2006 | Horman et al. |
| 2006/0141107 A1 | 6/2006 | Schwimmer et al. |
| 2006/0174346 A1 | 8/2006 | Carroll et al. |
| 2006/0259177 A1 | 11/2006 | Toyoshima et al. |
| 2007/0006324 A1 | 1/2007 | Osada et al. |
| 2007/0073433 A1 | 3/2007 | Froeschner et al. |
| 2007/0143601 A1 | 6/2007 | Arroyo et al. |
| 2007/0165508 A1 | 7/2007 | Kobayashi et al. |
| 2007/0171801 A1 | 7/2007 | Kobayashi et al. |
| 2007/0185815 A1 | 8/2007 | Boccon-Gibod et al. |
| 2007/0191982 A1 | 8/2007 | Sullivan |
| 2007/0211597 A1 | 9/2007 | Kobayashi et al. |
| 2007/0218426 A1 | 9/2007 | Quadling et al. |
| 2007/0250448 A1* | 10/2007 | Burkhart et al. ............ 705/59 |
| 2007/0282480 A1* | 12/2007 | Pannese et al. ............ 700/213 |
| 2008/0008348 A1 | 1/2008 | Metois et al. |
| 2008/0047006 A1 | 2/2008 | Jeong et al. |
| 2008/0082449 A1 | 4/2008 | Wilkinson et al. |
| 2008/0086777 A1 | 4/2008 | Sanchez |
| 2008/0091300 A1 | 4/2008 | Fletcher et al. |
| 2008/0111816 A1 | 5/2008 | Abraham et al. |
| 2008/0134319 A1* | 6/2008 | Baker et al. ............ 726/21 |
| 2008/0168527 A1* | 7/2008 | Koved et al. ............ 726/1 |
| 2008/0210747 A1 | 9/2008 | Takashima |
| 2008/0215176 A1* | 9/2008 | Borovinskih et al. ........ 700/117 |
| 2008/0271122 A1* | 10/2008 | Nolan et al. ............ 726/4 |
| 2008/0276791 A1 | 11/2008 | Lemons |
| 2008/0306874 A1 | 12/2008 | White |
| 2009/0137408 A1 | 5/2009 | Jacobson |
| 2009/0157452 A1 | 6/2009 | Arora et al. |
| 2009/0164379 A1 | 6/2009 | Jung et al. |
| 2009/0165126 A1 | 6/2009 | Jung et al. |
| 2009/0165127 A1 | 6/2009 | Jung et al. |
| 2009/0165147 A1 | 6/2009 | Jung et al. |
| 2009/0222914 A1 | 9/2009 | Ozawa |
| 2009/0238362 A1 | 9/2009 | Kitani et al. |
| 2010/0031351 A1 | 2/2010 | Jung et al. |
| 2010/0031374 A1 | 2/2010 | Jung et al. |

OTHER PUBLICATIONS

U.S. Appl. No. 12/288,336, Jung et al.
U.S. Appl. No. 12/290,001, Jung et al.
U.S. Appl. No. 12/321,365, Jung et al.
U.S. Appl. No. 12/321,385, Jung et al.
Dey, Anind K.; Abowd, Gregory D.; Salber, Daniel; "A Conceptual Framework and a Toolkit for Supporting the Rapid Prototyping of Context-Aware Applications"; Human-Computer Interaction; bearing a date of 2001; pp. 97-166 (print-out pp. 1-67); vol. 16; No. 2, 3 & 4.
Garfinkel, Tal; Pfaff, Ben; Chow, Jim; Rosenblum, Mendel; Boneh, Dan; "Terra: A Virtual Machine-Based Platform for Trusted Computing"; 19th Symposium on Operating System Principles (SOSP 2003); bearing a date of Oct. 19-22, 2003; pp. 1-14; Bolton Landing; New York; USA.
Garfinkel, Tal; Rosenblum, Mendel; Boneh, Dan; "Flexible OS Support and Applications for Trusted Computing"; Proceedings of HotOS IX: The 9th Workshop on Hot Topics in Operating Systems; bearing a date of May 18-21, 2003; total pp. 7; The USENIX Association.
Kraljic, Ivan C.; Quenot, Georges M.; Zavidovique, Bertrand; "A Methodology for Rapid Prototyping of Real-Time Image Processing VLSI Systems"; pp. 1-7; located at http://clips.imag.fr/mrim/georges.quenot/articles/rsp95.pdf.

* cited by examiner

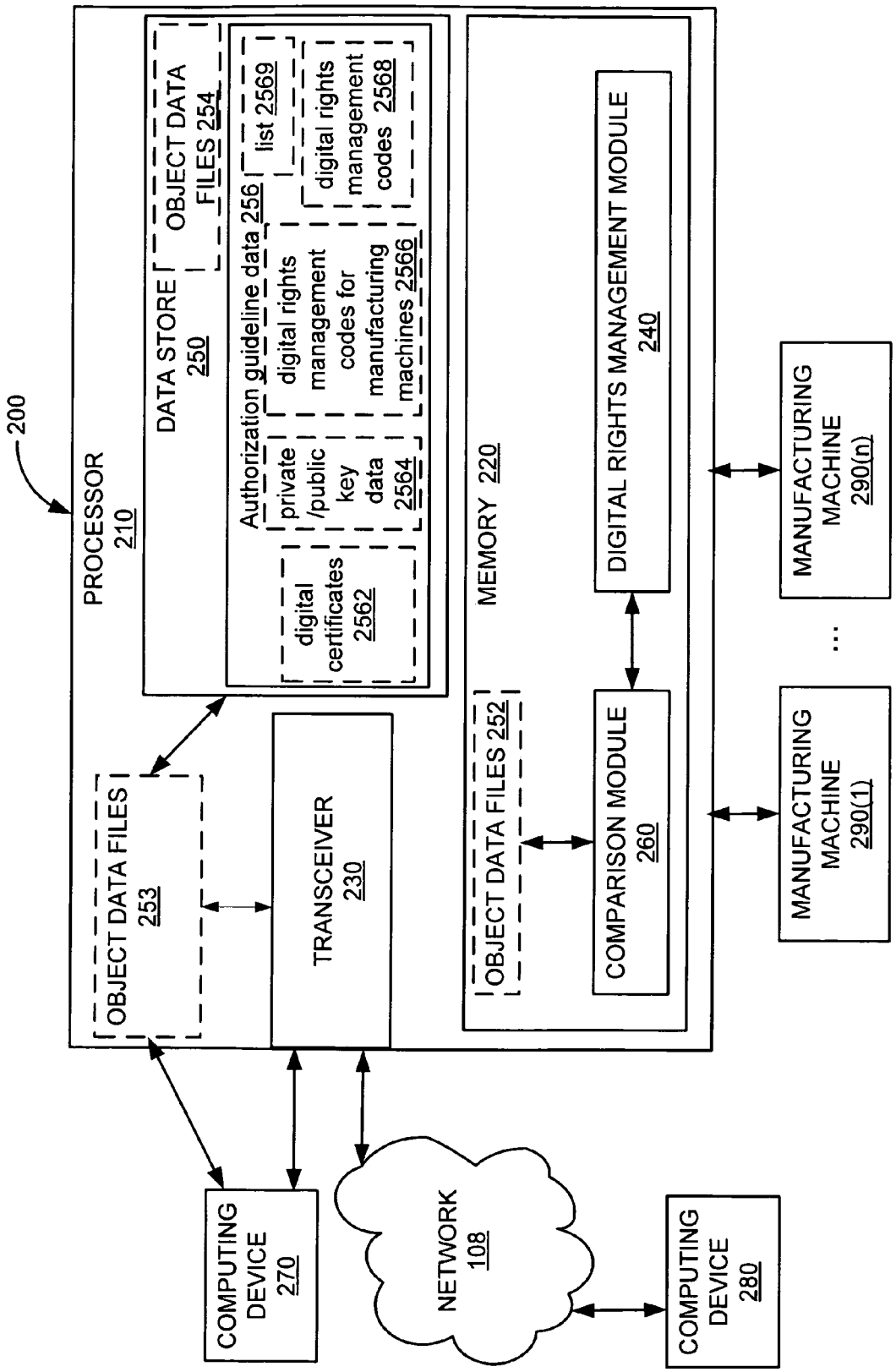

FIG. 3D

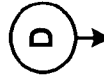

configuring one or more manufacturing machines to operate as a function of the authorization status 330 enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography 3302 enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/ or an additive manufacturing machine, and/or an injection molding machine 3304 enabling the one or more manufacturing machines to operate if the authorization status provides permission for operation wherein the one or more of an extrusion manufacturing machine, a melting manufacturing machine, a solidification manufacturing machine, an ejection manufacturing machine, a die casting manufacturing machine, a stamping process machine 3306

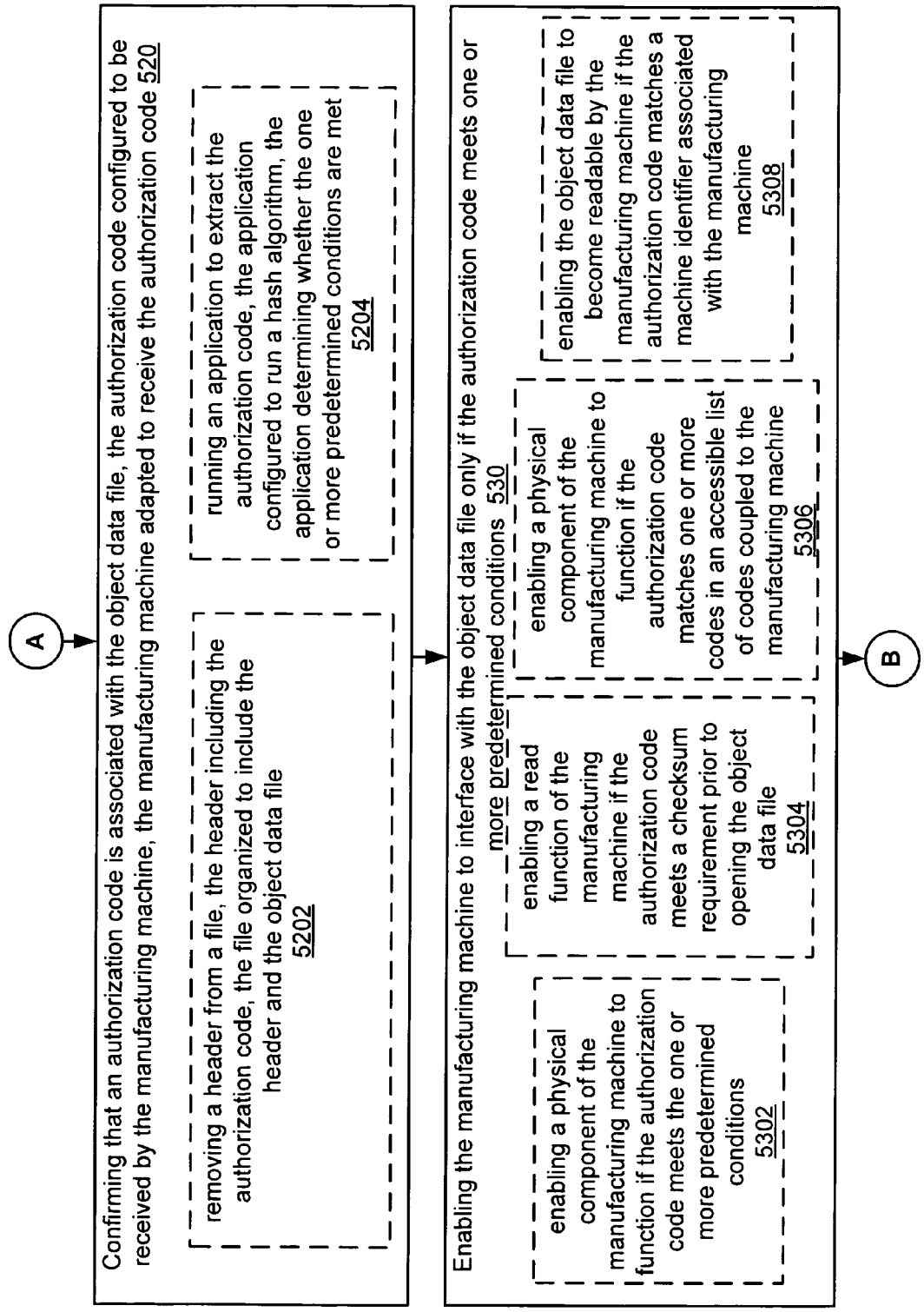

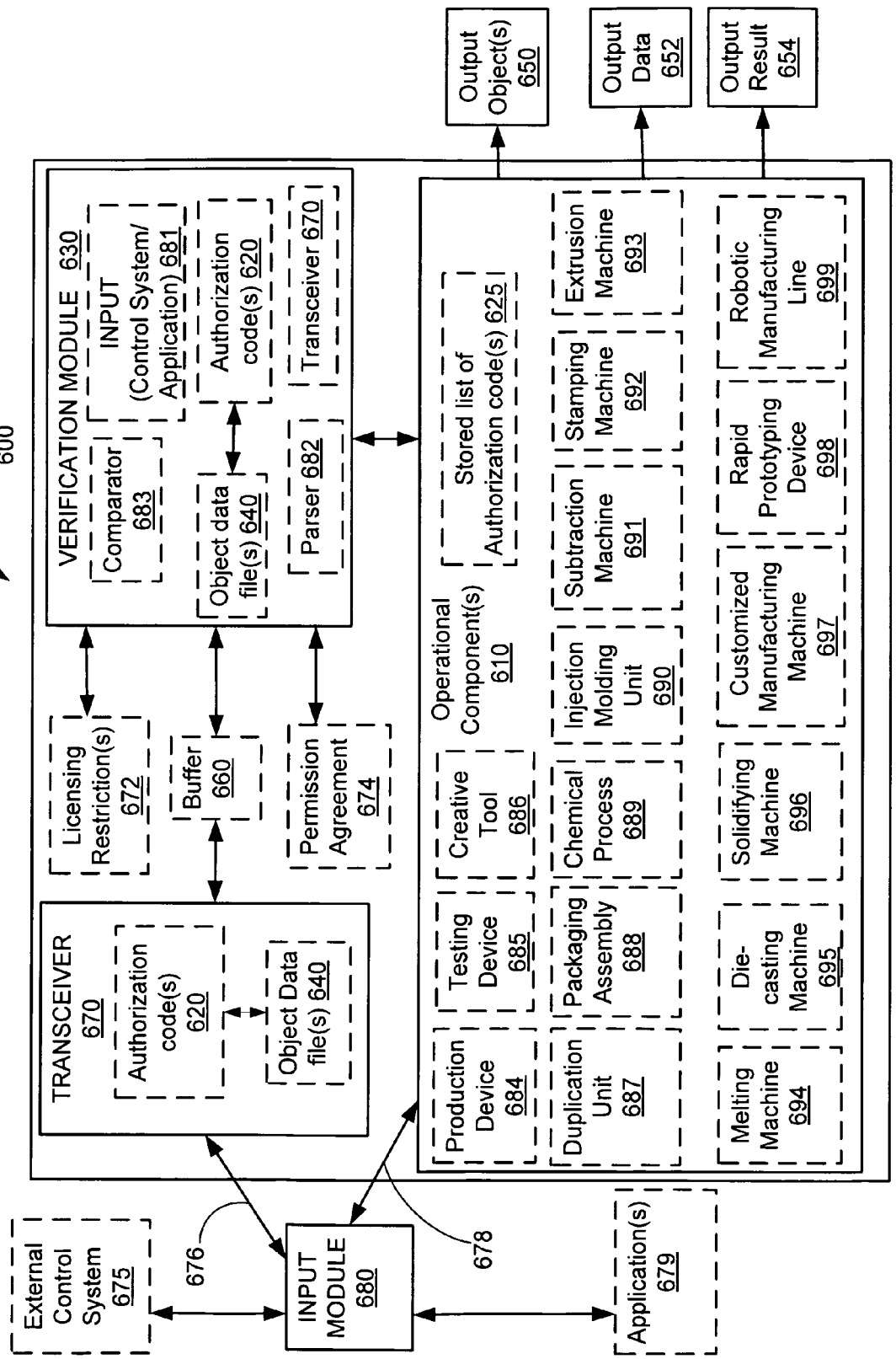

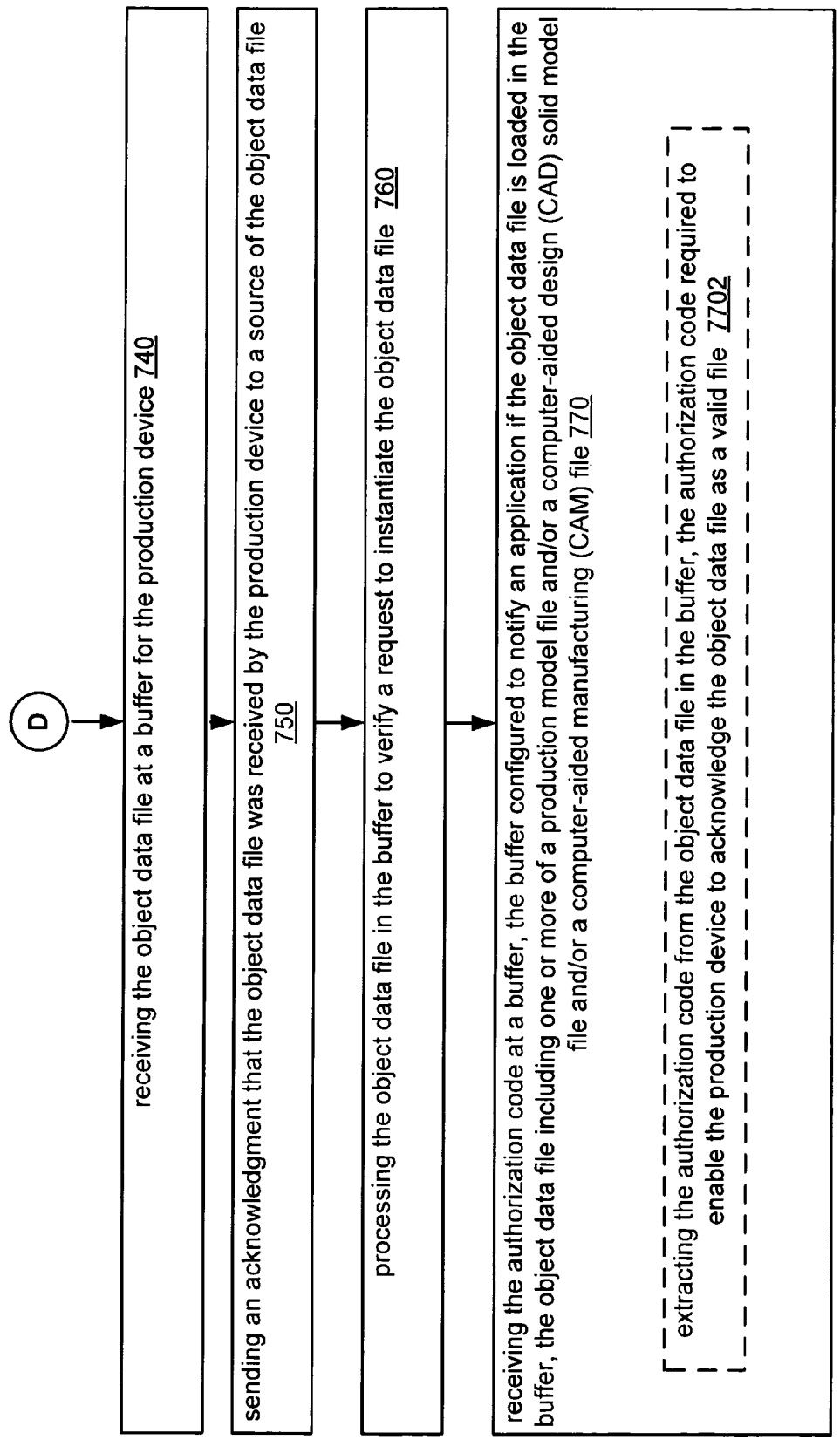

SECURITY-ACTIVATED OPERATIONAL COMPONENTS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/005,162 entitled CONTROL TECHNIQUE FOR OBJECT PRODUCTION RIGHTS, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 21 Dec. 2007, which is currently co-pending, or is an application of which a currently co-pending application is entitled to the benefit of the filing date.

The present application also constitutes a continuation-in-part of U.S. patent application Ser. No. 12/012,504 entitled MANUFACTURING CONTROL SYSTEM, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 31 Jan. 2008, which is currently co-pending, or is an application of which a currently co-pending application is entitled to the benefit of the filing date.

The present application also constitutes a continuation-in-part of U.S. patent application Ser. No. 12/079,921 entitled SECURITY-ACTIVATED PRODUCTION DEVICE, naming Edward K. Y. Jung, Royce A. Levien, Robert W. Lord, Mark A. Malamud, John D. Rinaldo, Jr., Clarence T. Tegreene, and Lowell L. Wood, Jr. as inventors, filed 27 Mar. 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at ttp://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The present application relates generally to a security-activated systems, devices and processes.

SUMMARY

Some embodiments provide a method for securely controlling an operation component, including obtaining access to an object data file configured to create or produce or duplicate or process or test one or more objects; verifying validity of an authorization code associated with the object data file; and responsive to said verifying validity, controlling the operational component by enabling or preventing its functional activation based on compliance with one or more predetermined conditions. In addition to the foregoing, other method aspects are described in the claims, drawings, and text forming a part of the present application.

Other embodiments may provide a computer program product including a computer readable medium configured to perform one or more acts for securely controlling an operational component, wherein one or more instructions provide for obtaining access to an object data file configured to create or produce or duplicate or process or test one or more objects; verifying validity of an authorization code associated with the object data file; and responsive to said verifying validity, controlling the operational component by enabling or preventing its functional activation based on compliance with one or more predetermined conditions. In addition to the foregoing, other computer program product aspects are described in the claims, drawings, and text forming a part of the present application.

In one or more various aspects, related systems include but are not limited to circuitry and/or programming for implementing the herein-referenced method aspects; the circuitry and/or programming can be virtually any combination of hardware, software, and/or firmware configured to effect the herein-referenced method aspects depending upon the design choices of the system designer.

Further embodiments may provide a security system for one or more operational components, including an authorization code that requires one or more pre-conditions to control an operational component that is configured to create or produce or duplicate or process or test an object; a verification module capable of enabling or disabling the operational component, the verification module operably coupled to the authorization code and operably coupled to the operational component; and an object data file associated with the authorization code, wherein the object data file is configured to activate the operational component based on confirmation from the verification module. In addition to the foregoing, other security-activated operational component aspects are described in the claims, drawings, and text forming a part of the present application.

The foregoing summary is illustrative only and is not intended to be in any way limiting. In addition to the illustrative aspects, embodiments, and features described above, fur-

BRIEF DESCRIPTION OF THE FIGURES

FIG. 2 is a block diagram of an exemplary system that supports the claimed subject matter of the present application.

FIGS. 3A, 3B, 3C, and 3D illustrate a flow diagram of an exemplary method in accordance with an embodiment of the subject matter of the present application.

FIGS. 5A, 5B and 5C illustrate a flow diagram of an exemplary method in accordance with an embodiment of the subject matter of the present application.

FIG. 6 is a block diagram of an exemplary system that supports the claimed subject matter of the present application.

FIGS. 7A, 7B, 7C, and 7D illustrate a flow diagram of an exemplary method in accordance with an embodiment of the subject matter of the present application.

DETAILED DESCRIPTION

Figure 1:
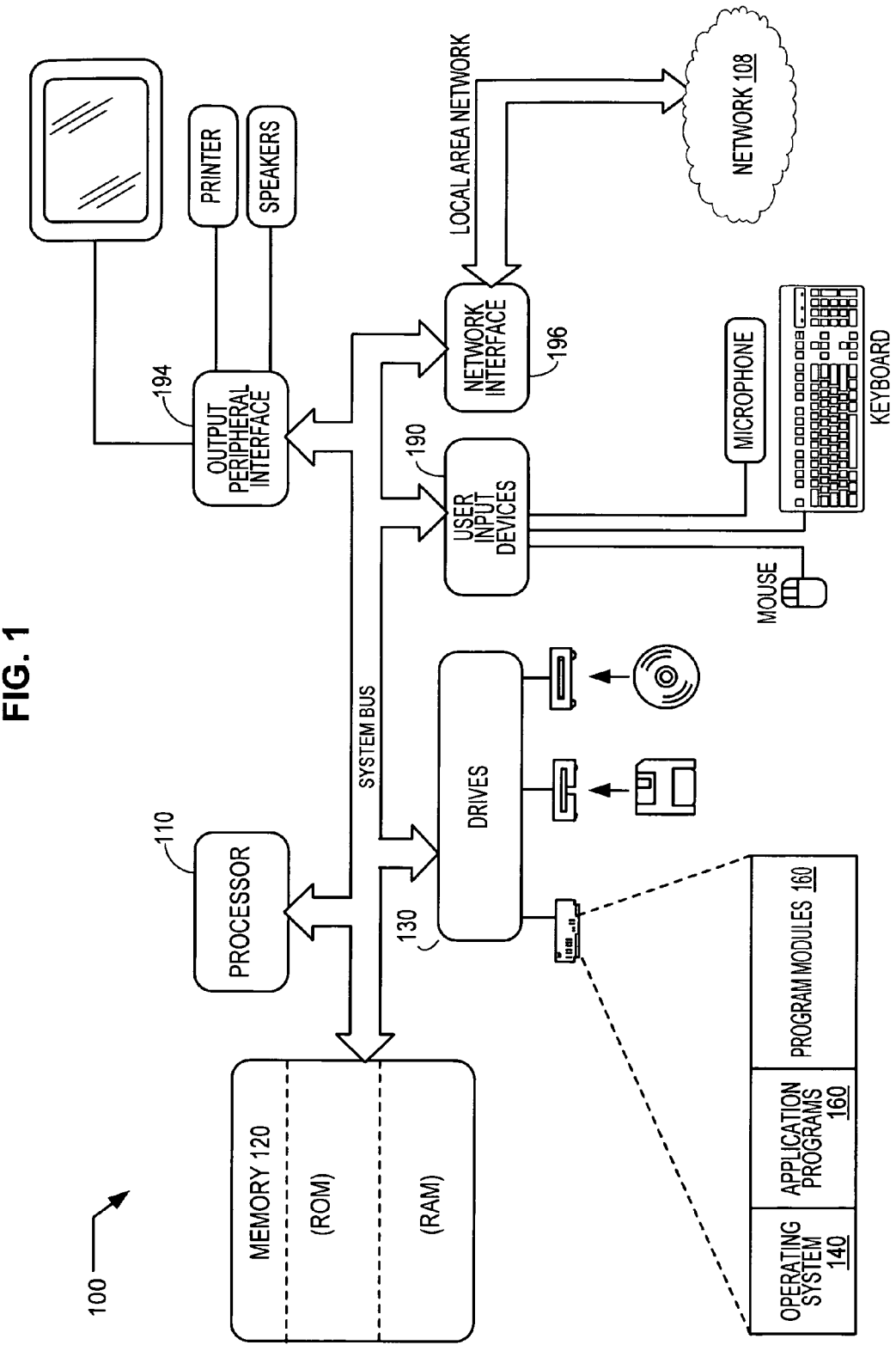
FIG. 1 is a block diagram of an exemplary computer architecture that supports the claimed subject matter of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, and program modules 160. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 is connected in a networking environment or a manufacturing machine either directly or via network 108 such that processor 110 and/or program modules 160 can perform a control technique for object production rights system capable of instantiating a digital rights management module in accordance with embodiments herein.

Referring now to FIG. 2, illustrated is an exemplary block diagram for an embodiment of a duplication control system 200 for implementing a control technique for object production rights system. As shown, duplication control system 200 includes a processor 210, a memory 220, coupled to the processor 210. FIG. 2 also illustrates a transceiver 230 which can be configured to send and receive one or more object data files or directly interact with a computing device 270 for receiving object data files. FIG. 2 also illustrates digital rights management module 240 accessible by processor 210 and by network 108 (see FIG. 1). FIG. 2 further illustrates a data store 250 coupled to processor 210. Digital rights management module 240 is configured to control digital rights for object data files. In one embodiment, digital rights management module 240 is coupled to comparison module 260, which can also be disposed within memory 220. In one embodiment, comparison module 260 compares the digital rights management codes to a stored list of digital rights management codes to determine the authorization status as a function of the status of one or more previously compiled object data files. Comparison module 260 can further interact with object data files residing in memory 252, outside of memory 253, or in data store as object data files 254. In one embodiment, object data files 252, 253 and/or 254 include one or more computer-aided design (CAD) solid model files configured to create three dimensional physical objects.

Data store 250 is configured to include authorization guideline data 256. In one embodiment, the authorization guideline data can include one digital certificates 2562, private/public key data 2564, one or more digital rights management codes 2566 for manufacturing machines, and/or digital rights management codes 2568. In one embodiment, authorization guideline data includes list 2569 which can be a list of digital rights management codes, a list of object data files, or any list that could be, for example, associated with multiple manufacturing machines 290 that require multiple authorization rights to be analyzed or the like. In one embodiment, list 2569 includes globally unique identifiers (GUID) that can function as digital rights management codes and provide cryptographic control over the one or more object data files.

In the embodiment in which data store 250 includes object data files 254, the object data files can be files that previously existed in data store 250, or can be files that were previously received by the duplication control system 200 via transceiver 230, memory 220, network 108.

In one embodiment, data store 250 stores digital rights management codes separately from object data files, with the digital rights management codes decipherable with a public key, private key combination.

FIG. 2 further illustrates manufacturing machines 290(1-n) coupled to control system 200. The multiple manufacturing machines 290(1-n) can allow manufacture of an object described by the one or more object data files according to permissions provided in the one or more digital rights management codes.

In one embodiment, duplication control system 200 is coupled to each of the one or more manufacturing machines 290(1-n) to allow manufacture of an object described by the one or more object data files according to permissions provided in the one or more digital rights management codes.

In one embodiment, manufacturing machines 290(1-n) are three-dimensional additive manufacturing machines configured for rapid prototyping, three-dimensional printing, two-dimensional printing, freeform fabrication, solid freeform fabrication, and stereolithography.

In another embodiment, manufacturing machines 290(1-n) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-n) can include an extrusion manufacturing machine, a melting manufacturing machine, a solidification manufacturing machine, an ejection manufacturing machine, a die casting manufacturing machine, a stamping process machine.

In another embodiment, manufacturing machines 290(1-n) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-n) can include a manufacturing machine configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

It will be understood that the illustrated system embodiments of FIGS. 1-2 are provide by way of example only, and are not intended to be limiting. Furthermore, it will be understood that the various process features and system components disclosed herein may be incorporated in different embodiment combinations depending on the circumstances.

Referring now to FIGS. 3A, 3B, 3C and 3D an exemplary flow diagram illustrates the operation of a control technique for object production rights system according to one or more embodiments.

Figure 3A:
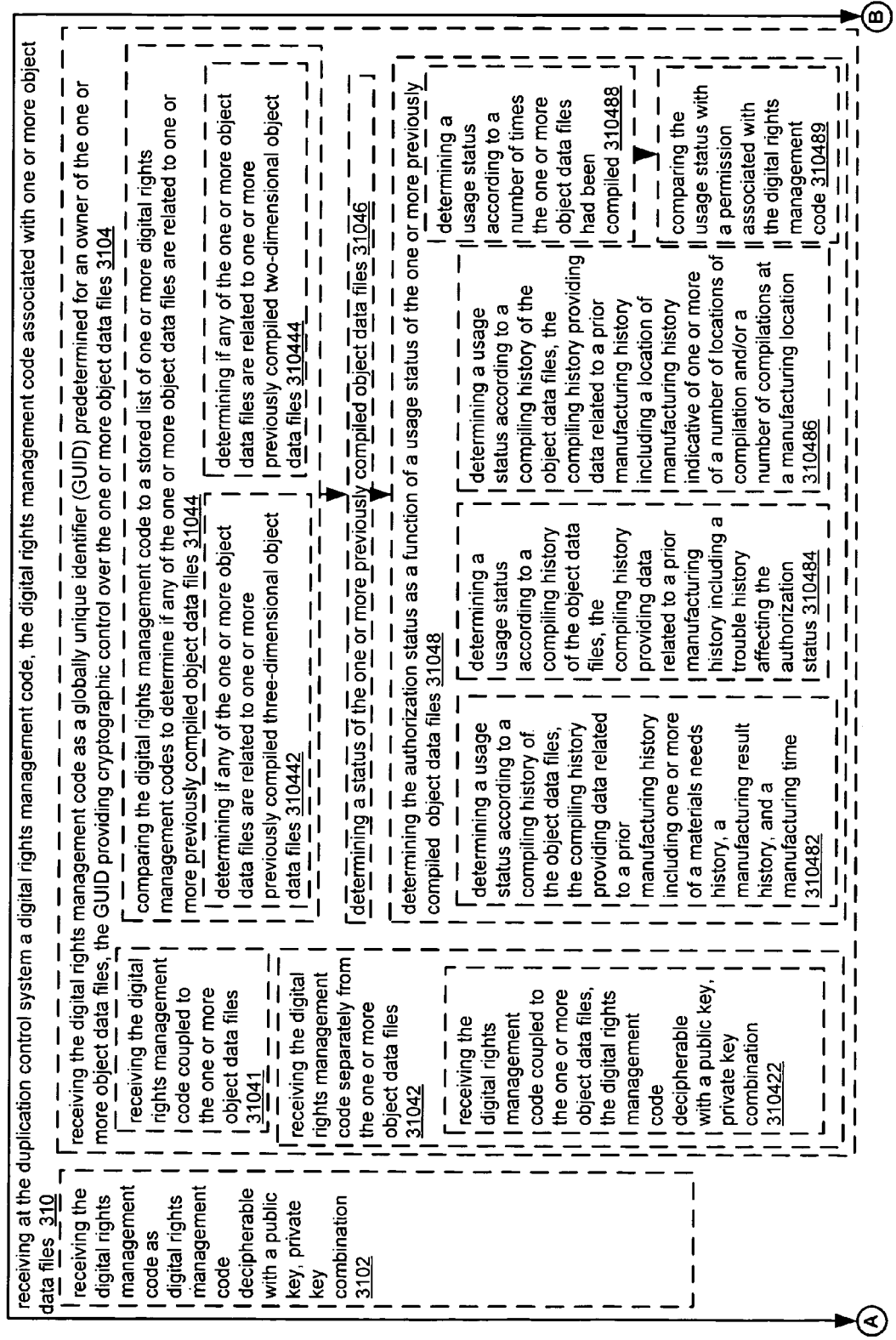

As illustrated in FIG. 3A, block 310 provides for receiving at the duplication control system a digital rights management code, the digital rights management code associated with one or more object data files (e.g., duplication control system 200 receiving digital rights management code associated with one or more object data file via computing deice 270, network 108, and/or manufacturing machine(s) 290(1-n)). Depicted within block 310 is optional block 3102, which provides for receiving the digital rights management code as digital rights management code decipherable with a public key, private key combination (e.g., a duplication control system 200 receiving one or more digital rights management code as cryptographically sealed code requiring a public key, private key pair).

Depicted within block 310 is optional block 3104, which provides for receiving the digital rights management code as a globally unique identifier (GUID) predetermined for an owner of the one or more object data files, the GUID providing cryptographic control over the one or more object data files (e.g., a duplication control system 200 receiving digital rights management code as a globally unique identifier (GUID) predetermined for an owner of the one or more object data files, the GUID providing cryptographic control from a manufacturing machine 290, and/or computer 100).

Depicted within block 3104 is optional block 31041 which provides for receiving the digital rights management code coupled to the one or more object data files (e.g., duplication control system 200 receiving digital rights management code coupled to one or more object data files).

Depicted within block 3104 is optional block 31042 which provides for receiving the digital rights management code separately from the one or more object data files (e.g., duplication control system 200 receiving digital rights management code in a separate transaction over transceiver 230).

Depicted within block 30142 is optional block 310422 which provides for receiving the digital rights management code coupled to the one or more object data files, the digital rights management code decipherable with a public key, private key combination (e.g., duplication control system 200 receiving digital rights management code over network 108, from computing device 270 and/or from manufacturing machine 290(1-n) wherein the digital rights management code is protected by a public key, private key pair). In one embodiment the digital rights management codes can be globally unique identifier (GUID) predetermined for an owner of the one or more object data files, the GUID providing cryptographic control over the one or more object data files. In other embodiments, the GUID can be associated with a public/private key pair.

Also depicted within block 3104 is optional block 31044, which provides for comparing the digital rights management code to a stored list of one or more digital rights management codes to determine if any of the one or more object data files are related to one or more previously compiled object data files (e.g., comparison module 260 performing comparisons of the digital management code with a stored list in data store 250 of digital rights management codes to determine if the object data files are related to one more previously compiled object data files, the object data files can be received via manufacturing machine 290(1-n), computing device 270 and/or computing device 280 over network 109). Optional block 31044 is coupled to optional block 31046 which provides for determining a status of the one or more previously compiled object data files (e.g., digital rights management module 240 determining a status of the previously compiled object data files).

Optional block 31046 is further coupled to optional block 31048 which provides for determining the authorization status as a function of a usage status of the one or more previously compiled object data files (e.g., digital rights management module 240 determining a status as a function of a usage status of the previously compiled object data files).

Optional block 31048 includes optional block 310482 which provides for determining a usage status according to a compiling history of the object data files, the compiling history providing data related to a prior manufacturing history including one or more of a materials needs history, a manufacturing result history, and a manufacturing time (e.g., digital rights management module 240 determining a status of the previously compiled object data files received via network 108, computing device 270, manufacturing machines 290(1-n) and/or data store 250).

Block 31048 further depicts optional block 310484, which provides for determining a usage status according to a compiling history of the object data files, the compiling history providing data related to a prior manufacturing history including a trouble history affecting the authorization status (e.g., digital rights management module 240 determining a status of the previously compiled object data files compiling history and trouble history affecting an authorization status received via network 108, computing device 270, manufacturing machines 290(1-n) and/or data store 250).

Further depicted within block 31048 is optional block 310486 which provides for determining a usage status according to a compiling history of the object data files, the compiling history providing data related to a prior manufacturing history including a location of manufacturing history indicative of one or more of a number of locations of compilation and/or a number of compilations at a manufacturing location (e.g., digital rights management module 240 determining a number of locations of compilation and/or number of compilations of the previously compiled object data files received via network 108, computing device 270, manufacturing machines 290(1-n) and/or data store 250).

Optional block 31048 further depicts optional blocks 310488 and 310489. Optional block 310488 provides for determining a usage status according to a number of times the one or more object data files had been compiled (e.g., digital rights management module 240 determining a status of the previously compiled object data files received via network 108, computing device 270, manufacturing machines 290(1-n) and/or data store 250). Optional block 31049 provides for comparing the usage status with a permission associated with the digital rights management code (e.g., digital rights management module 240 determining a status of the previously compiled object data files received via network 108, computing device 270, manufacturing machines 290(1-n) and/or data store 250 and comparing via comparison module 260 a usage status with a permission associated with the digital rights management code).

Figure 3B:
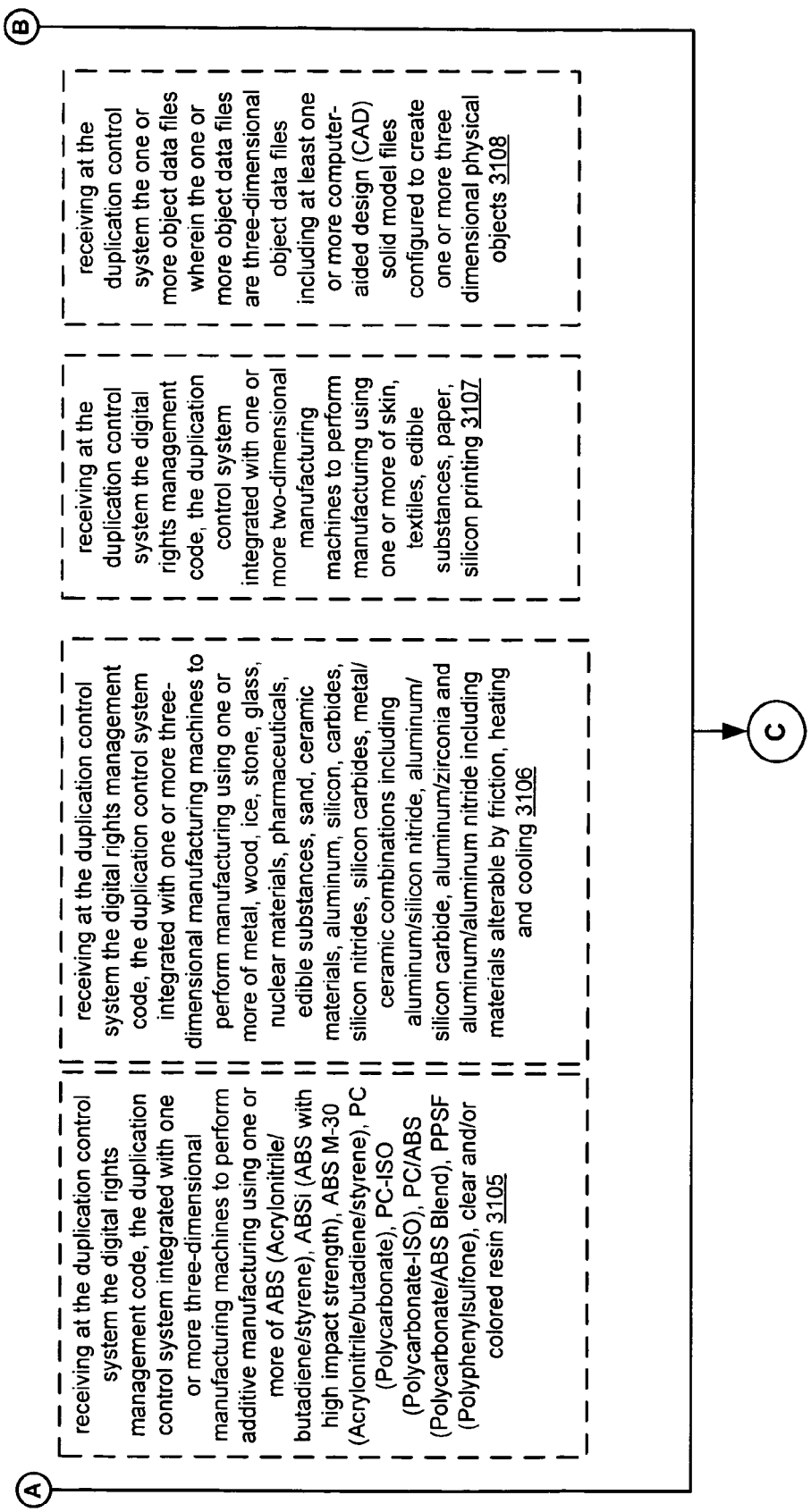

Referring now to FIG. 3B, the flow diagram depicting a method according to an embodiment continues. Specifically, block 310 further depicts optional block 3105, which provides for receiving at the duplication control system the digital rights management code, the duplication control system integrated with one or more three-dimensional manufacturing machines to perform additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., duplication control system 200 receiving digital rights management code, wherein duplication control system 200 is integrated with one or more of manufacturing machines 290(1-n) that perform three-dimensional manufacturing to perform additive manufacturing).

Block 310 further depicts optional block 3106, which provides for receiving at the duplication control system the digital rights management code, the duplication control system integrated with one or more three-dimensional manufacturing machines to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., duplication control system 200 receiving digital rights management code, wherein duplication control system 200 is integrated with one or more of manufacturing machines 290(1-n) that perform three-dimensional manufacturing to perform manufacturing of metal, wood, ice, stone, glass, nuclear materials, pharmaceuticals, edible substances, sand, ceramic materials, aluminum, silicon, carbides, silicon nitrides, silicon carbides, and/or metal/ceramic combinations).

Block 310 further depicts optional block 3107, which provides for receiving at the duplication control system the digital rights management code, the duplication control system integrated with one or more two-dimensional manufacturing machines to perform manufacturing using one or more of skin, textiles, edible substances, paper, silicon printing (e.g., duplication control system 200 receiving digital rights management code, wherein duplication control system 200 is integrated with one or more of manufacturing machines 290 (1-n) to perform two-dimensional manufacturing).

Block 310 further depicts optional block 3108, which provides for receiving at the duplication control system the one or more object data files wherein the one or more object data files are three-dimensional object data files including at least one or more computer-aided design (CAD) solid model files configured to create one or more three dimensional physical objects (e.g., duplication control system 200 receiving digital rights management code, wherein duplication control system 200 is integrated with one or more of manufacturing machines 290(1-n) to perform three-dimensional manufacturing of CAD files.

Figure 3C:
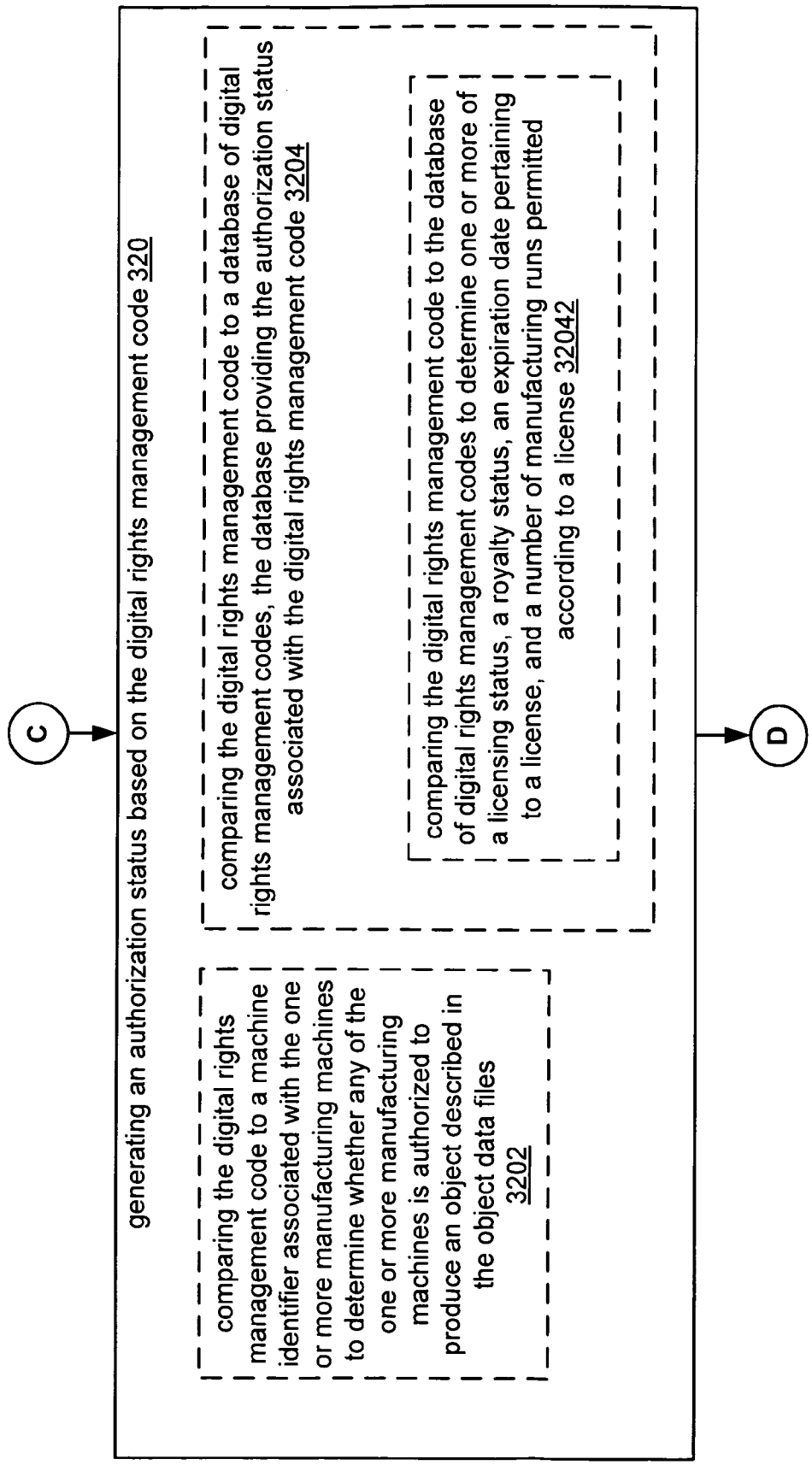

Referring now to FIG. 3C, the flow diagram depicting a method in accordance with an embodiment continues. Block 320 illustrates an aspect for generating an authorization status based on the digital rights management code (e.g., digital rights management module 240 generating the authorization status based on received or stored digital rights management code). Depicted within block 320 is optional block 3202 which provides for comparing the digital rights management code to a machine identifier associated with the one or more manufacturing machines to determine whether any of the one or more manufacturing machines is authorized to produce an object described in the object data files (e.g. comparison module 260 comparing the digital rights management code to a machine identifier supplied by one or more of manufacturing machines 290(1-n)).

Block 320 further depicts optional block 3204 which provides for comparing the digital rights management code to a database of digital rights management codes, the database providing the authorization status associated with the digital rights management code (e.g., comparison module 260 comparing the digital rights management code to a database in data store 250 storing digital rights management codes, including authorization status).

Depicted within optional block 3204 is optional block 32042 which provides for comparing the digital rights management code to the database of digital rights management codes to determine one or more of a licensing status, a royalty status, an expiration date pertaining to a license, and a number of manufacturing runs permitted according to a license (e.g., comparison module 260 comparing the digital rights management code to determine a licensing status, royalty status, expiration date, number of times a license permits a manufacturing run and the like).

Referring now to FIG. 3D, the flow diagram continues illustrating the method in accordance with an embodiment with block 330. Specifically, block 330 illustrates an aspect for configuring one or more manufacturing machines to operate as a function of the authorization status (e.g., processor 210 and digital rights management module configuring one or more manufacturing machines 290(1-n) to operate in accordance with the authorization status determined by comparison module 260).

Depicted within block 330 is optional block 3302 which provides for enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and stereolithography (e.g., digital rights management module 240 interacting with one or more of manufacturing machines 290(1-n) to operate according the authorization status).

Also depicted within block 330 is optional block 3304 which provides for enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine (e.g., digital rights management module 240 interacting with the one or more manufacturing machines 290(1-n) to operate if the authorization status provides permission for operation, the one or more manufacturing machines 290(1-n) including subtractive manufacturing machines).

Further depicted within block 330 is optional block 3306 which provides for enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine (e.g., digital rights management module 240 interacting with the one or more manufacturing machines 290(1-n) to operate if the authorization status provides permission for operation, the one or more manufacturing machines 290 (1-n) can include an extrusion manufacturing machine, a melting manufacturing machine, a solidification manufacturing machine, an ejection manufacturing machine, a die casting manufacturing machine, a stamping process machine or the like).

Figure 4:
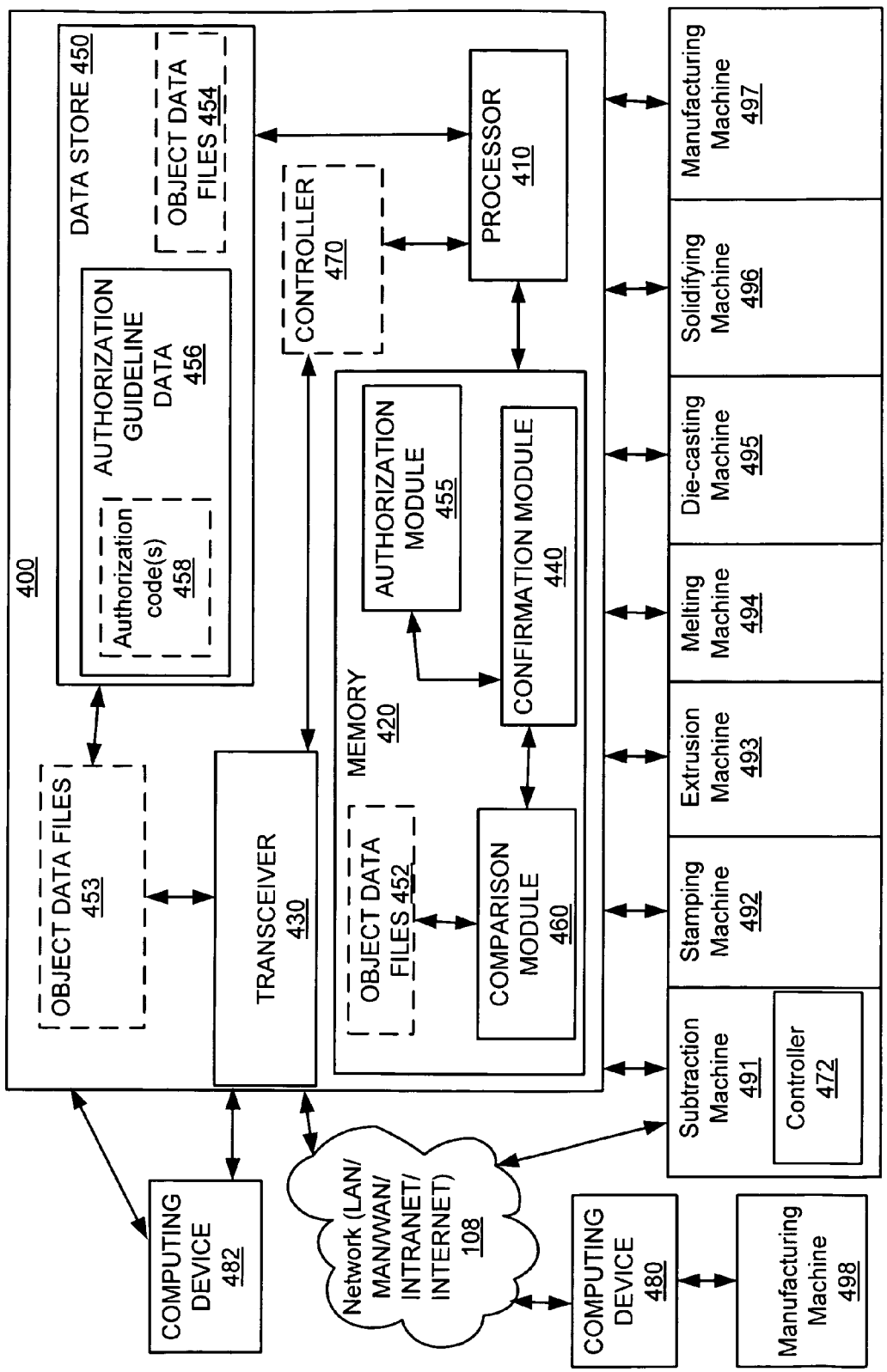
FIG. 4 is a block diagram of an exemplary system that supports the claimed subject matter of the present application.

Referring now to the schematic depiction of FIG. 4, illustrated is an exemplary block diagram for an embodiment of a manufacturing control system 400 for controlling digital production rights for producing a physical object. As shown, manufacturing control system 400 includes a memory 420 coupled to the processor 410. Manufacturing control system 400 further includes transceiver 430 that is shown to be coupled through optional controller 470 to processor 410. FIG. 4 also illustrates transceiver 430 which can be configured to send and receive one or more object data files or directly interact with a computing device 482 for receiving object data files. FIG. 4 also illustrates digital rights confirmation module 440 accessible by processor 410 and by network 108 (see FIG. 1). FIG. 4 further illustrates a data store 450 and an authorization module 455 coupled to processor 410.

Digital rights confirmation module 440 is configured to control digital rights for object data files 452, 453 and/or 454. Authorization module 455 is configured for enabling a manufacturing machine (e.g., manufacturing machines 497, 498) to interface with an object data file only if an authorization code 458 meets one or more predetermined conditions. In one embodiment, digital rights confirmation module 440 is coupled to authorization module 455 and to comparison module 460, which can also be disposed within memory 420. In one embodiment, comparison module 460 compares one or more authorization codes to a stored list of digital rights management codes to determine the authorization status as a function of the status of one or more previously compiled object data files. Comparison module 460 can further interact with object data files 452, object data files 453, or object data files 454. In one embodiment, object data files 452, 453 and/or 454 include one or more computer-aided design (CAD) solid model files configured to create three dimensional physical objects. In other embodiments the object data files are configured to create two-dimensional objects, renderings, prototypes and the like. Data store 450 is configured to include authorization guideline data 456 such as authorization code(s) 458 or other digital rights authorization data. In the embodiment in which data store 450 includes object data files 454, the object data files can be files that previously existed in data store 450, or can be files that were previously received by the manufacturing control system 400 via transceiver 430, memory 420, network 108.

FIG. 4 further illustrates manufacturing machines coupled to control system 400. Specifically, manufacturing control system 400 is illustrated coupled to subtraction machine 491, stamping machine 492, extrusion machine 493, melting machine 494, die-casting machine 495, solidifying machine 496, and generic manufacturing machine 497. Manufacturing control system 400 is further coupled to manufacturing machine 498 via network 108 and computing device 480. In one embodiment, subtraction machine 491 can be configured with a controller 472 and be alternatively coupled to manufacturing control system via network 108 or directly. Subtraction machine 491 illustrates an exemplary manufacturing machine with a controller 472 to control digital production rights directly and/or over a network connection. Likewise, manufacturing machine 498 could be coupled to a controller located in computing device 480 or receive control directions from manufacturing control system 400. Each of manufacturing machines 491-498 can allow manufacture of an object described by the one or more object data files as directed by manufacturing control system 400 and controllers 470 and 472.

As shown, manufacturing machines 491-498 can be three-dimensional additive manufacturing machines configured for rapid prototyping, three-dimensional printing, two-dimensional printing, freeform fabrication, solid freeform fabrication, and stereolithography.

Manufacturing machines 491-498 include a subtractive manufacturing machine 491, which can be adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

Manufacturing machines 491-498 are shown including an extrusion manufacturing machine 493, a melting manufacturing machine 494, a solidification manufacturing machine 496, a die casting manufacturing machine 495, a stamping process machine 492, and a generic manufacturing machine 497 which can be configured as an ejection manufacturing machine.

In another embodiment, manufacturing machines 497 and/or 498 can be configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia, aluminum/aluminum nitride including materials alterable by friction, heating and cooling.

In another embodiment, manufacturing machines 497 and/or 498 can include a manufacturing machine configured as two-dimensional manufacturing machines configured to perform manufacturing of one or more of skin, textiles, edible substances, paper and/or silicon printing.

Figure 5A:
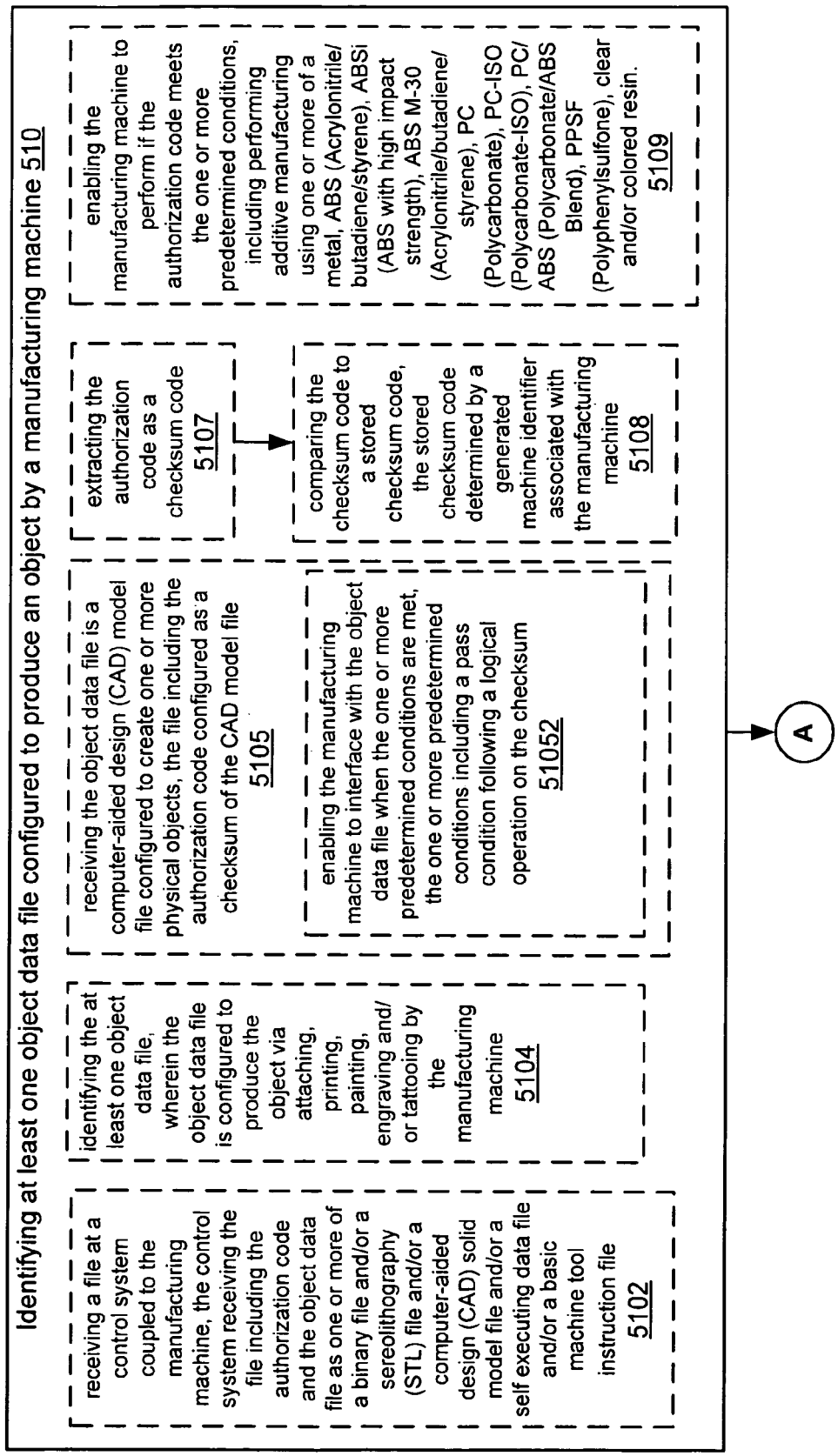
Figure 5C:
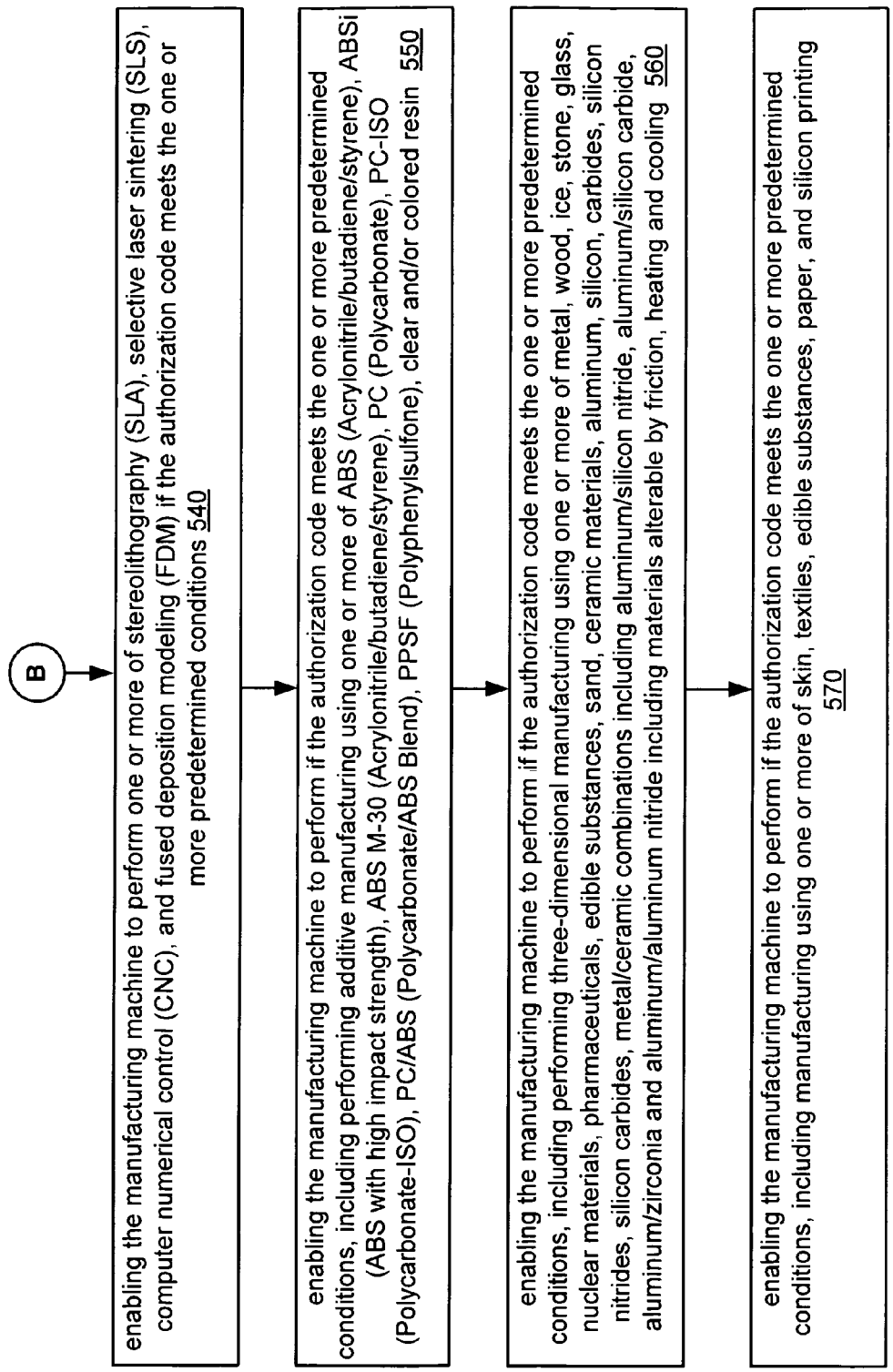

Referring now to FIG. 5A, 5B and 5C, a flow diagram illustrates a method in accordance with an embodiment. Block 510 provides for identifying at least one object data file configured to produce an object by a manufacturing machine (e.g., controller 470 and/or 472 identifying object data files 452, 453, 454 to produce an object by manufacturing machines 497, 498, and/or subtraction machine 491, stamping machine 492, extrusion machine 493, melting machine 494, die-casting machine 495 and/or solidifying machine 496). Disposed within block 510 is optional block 5102 which provides for receiving a file at a control system coupled to the manufacturing machine, the control system receiving the file including the authorization code and the object data file as one or more of a binary file and/or a stereolithography (STL) file and/or a computer-aided design (CAD) solid model file and/or a self executing data file and/or a basic machine tool instruction file (e.g., transceiver 430 in control system 400 receiving object data files 452, 453, 454). Further disposed in block 510 is optional block 5104 which provides for identifying the at least one object data file, wherein the object data file is configured to produce the object via attaching, printing, painting, engraving and/or tattooing by the manufacturing machine (e.g., transceiver 430 and control system 400 identifying object data files 452, 453, 454). Further disposed in block 510 is block 5105 which provides for receiving the object data file as a computer-aided design (CAD) model file configured to create one or more physical objects, the object data file including the authorization code configured as a checksum of the CAD model file (e.g., transceiver 430 receiving object data files 452, 453, 454 including authorization code configured as a checksum of a CAD model file).

Disposed within block 5105 is optional block 51052, which provides for enabling the manufacturing machine to interface with the object data file when the one or more predetermined conditions are met, the one or more predetermined conditions including a pass condition following a logical operation on the checksum (e.g., controller 470, controller 472 and/or processor 410 enabling manufacturing machines 497, 498, and/or subtraction machine 491, stamping machine 492, extrusion machine 493, melting machine 494, die-casting machine 495 and/or solidifying machine 496 to interface with object data files 452, 453, and/or 454 when predetermined conditions are met, including a pass condition).

Further disposed in block 510 is optional block 5107 and optional block 5108. Optional block 5107 provides for extracting the authorization code as a checksum code (e.g., processor 410, controller 470 and/or controller 472 extracting authorization code from object data files 452, 453 and/or 454). Optional block 5108 provides for comparing the checksum code to a stored checksum code, the stored checksum code determined by a generated machine identifier associated with the manufacturing machine (e.g. comparison module 460 comparing checksum code to checksum code stored in data store 450 and/or manufacturing machines 497, 498, and/or subtraction machine 491, stamping machine 492, extrusion machine 493, melting machine 494, die-casting machine 495 and/or solidifying machine 496).

Further disposed in block 510 is optional block 5109 which provides for enabling the manufacturing machine to perform if the authorization code meets the one or more predetermined conditions, including performing additive manufacturing using one or more of a metal, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., controller 470, 472 and/or control system 400 enabling manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 520 provides for confirming that an authorization code is associated with the object data file, the authorization code configured to be received by the manufacturing machine, the manufacturing machine adapted to receive the authorization code (e.g. controller 470 and/or 472 and/or manufacturing control system 400 confirming that an authorization code is associated with one or more of object data files 452, 453, and/or 454 to be received by one or more of manufacturing machines 491-498. Depicted within block 520 is optional block 5202 which provides for removing a header from a file, the header including the authorization code, the file organized to include the header and the object data file (e.g. processor 410 removing a header from one or more of object data files 452, 453 and/or 454, the header including the authorization code). Further depicted in block 520 is optional block 5204 which provides for running an application to extract the authorization code, the application configured to run a hash algorithm, the application determining whether the one or more predetermined conditions are met (e.g., processor 410 running an application (e.g., application 679) or an application stored in memory 420 to extract an authorization code from one or more of object data files 452, 453, and/or 454).

Block 530 provides for enabling the manufacturing machine to interface with the object data file only if the authorization code meets one or more predetermined conditions (e.g., controller 470, 472 and/or control system 400 enabling manufacturing machines 497, 498, and/or subtraction machine 491, stamping machine 492, extrusion machine 493, melting machine 494, die-casting machine 495 and/or solidifying machine 496 to interface with object data files 452, 453, and/or 454 only if the authorization code meets one or more predetermined conditions). Depicted within block 530 is optional block 5302 which provides for enabling a physical component of the manufacturing machine to function if the authorization code meets the one or more predetermined conditions (e.g., controller 470, 472 and/or control system 400 enabling physical component within or attached to manufacturing machines 497, 498, and/or subtraction machine 491, stamping machine 492, extrusion machine 493, melting machine 494, die-casting machine 495 and/or solidifying machine 496 to function if the authorization code meets predetermined conditions). Also depicted within block 530 is optional block 5304, which provides for enabling a read function of the manufacturing machine if the authorization code meets a checksum requirement prior to opening the object data file (e.g., controller 470, 472 and/or control system 400 enabling a read function of manufacturing machines 497, 498, and/or subtraction machine 491, stamping machine 492, extrusion machine 493, melting machine 494, die-casting machine 495 and/or solidifying machine 496 if the authorization code meets a checksum requirement). Further depicted within block 530 is optional block 5306 which provides for enabling a physical component of the manufacturing machine to function if the authorization code matches one or more codes in an accessible list of codes coupled to the manufacturing machine (e.g., controller 470, 472 and/or control system 400 enabling a physical component of manufacturing machines 497, 498, and/or subtraction machine 491, stamping machine 492, extrusion machine 493, melting machine 494, die-casting machine 495 and/or solidifying machine 496 if the authorization code matches an accessible list of codes). Further depicted within block 530 is optional 5308 which provides for enabling the object data file to become readable by the manufacturing machine if the authorization code matches a machine identifier associated with the manufacturing machine (e.g., controller 470, 472 and/or control system 400 enabling one or more of object data files 452, 453, and/or 454 to become readable by one or more of manufacturing machines 497, 498, and/or subtraction machine 491, stamping machine 492, extrusion machine 493, melting machine 494, die-casting machine 495 and/or solidifying machine 496 if the authorization code matches a machine identifier associated with the one or more manufacturing machines 491-498).

Block 540 provides for enabling the manufacturing machine to perform one or more of stereolithography (SLA), selective laser sintering (SLS), computer numerical control (CNC), and fused deposition modeling (FDM) if the authorization code meets the one or more predetermined conditions (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform one or more of stereolithography (SLA), selective laser sintering (SLS), computer numerical control (CNC), and fused deposition modeling (FDM) if the authorization code meets the one or more predetermined conditions).

Block 550 provides for enabling the manufacturing machine to perform if the authorization code meets the one or more predetermined conditions, including performing additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 560 provides for enabling the manufacturing machine to perform if the authorization code meets the one or more predetermined conditions, including performing three-dimensional manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Block 570 provides for enabling the manufacturing machine to perform if the authorization code meets the one or more predetermined conditions, including manufacturing using one or more of skin, textiles, edible substances, paper, and silicon printing (e.g. controller 470, 472 and/or control system 400 enabling one or more of manufacturing machines 497, 498, and/or subtraction machine 491, stamping machine 492, extrusion machine 493, melting machine 494, die-casting machine 495 and/or solidifying machine 496 to perform if the authorization code meets the one or more predetermined conditions).

Referring now to FIG. 6, an exemplary embodiment of a security control system 600 is illustrated. More particularly, FIG. 6 illustrates a security control system 600 including one or more operational components 610; authorization code(s) 620 that requires one or more pre-conditions for controlling operation of an operational component 610, and verification module 630 capable of enabling or disabling an operational component 610. Verification module 630 is shown operably coupled to authorization code(s) 620, which can be stored locally as well as received via buffer 660 and/or transceiver 670. The buffer 660 shown in dashed lines is coupled to the verification module 630 and to transceiver 670. It will be understood that the buffer 660 can be configured to send an acknowledgement that the object data file was received by the security control system 600. In one embodiment, transceiver 670 can be configured to operate as a buffer. In other embodiments, transceiver 670 can function only as a transmitting device coupled to a separate buffer 660 as will be appreciated by one of skill in the art. In either case, according to an embodiment, buffer 660 or transceiver 670 configured as a buffer can be adapted for processing object data file(s) 640 to verify a request to implement (e.g., instantiate) the object data file 640 received from input module 680.

Verification module 630 can include authorization codes 620 as a data store of authorization code(s) 620 within verification module 630 or as separately received authorization codes via input module 680. In some instances an input module 680 may be incorporated as part of the security control system 600. In one embodiment, inputs 676 and 678 received from an external control system 675 can be associated with an operational component for creating, producing, duplicating, processing, or testing an object in accordance with a security technique disclosed herein. For example, input 676 and/or input 678 could be adapted to enable creating, producing, duplicating, processing, and/or testing in accordance with authorization code(s) 620. As one of skilled in the art with the benefit of the present application will appreciate, input 676 could be configured to serve as an internal source of object data, applications (e.g., see 679) and the like.

Security control system 600 also includes object data file(s) 640, associated with authorization code(s) 620. Object data file(s) 640 are configured to enable an operational component 610 to initiate or prevent an operational function regarding an operational output (see output objects 650, output data 652, output result 654) based on confirmation or preventive indications from verification module 630 and/or authorization code(s) 620 in accordance with a predetermined condition. Object data file(s) 640 can be configured as operational instructions, production model files, computer-aided manufacturing (CAM) files, and/or computer-aided design (CAD) solid model files or the like.

In one embodiment, security control system 600 includes buffer 660 that is adapted to receive the authorization code(s) 620 and notify verification module 630 that an object data file(s) 640 is loaded in buffer 660 and/or transceiver 670 configured to operate as a buffer.

In one embodiment, verification module 630 is configured to extract authorization code(s) 620 from object data file(s) 640 so that the authorization code(s) 620 can enable the security control system 600 to acknowledge the object data file as a valid file or invalid file. Alternatively or additionally, verification module 630 can be configured to extract the authorization code(s) 620 which could include various security implementations such as, for example, a redundancy check, error checking algorithm, checksum, and/or cryptographic hash function code(s). In another embodiment, verification module 630 includes a parser 682 configured for removing a header from the object data file(s) 640. In one embodiment, the header can include authorization code(s) 620. Verification module 630 can also be configured to include transceiver 670 to receive authorization code(s) 620 via input module 680. In some instances, transceiver 670 can be coupled to both an external control system 675 and an operational component 610 to receive an enabling signal from the external control system 675 to enable implementation of an operational output (see output objects 650, output data 652, output result 654).

In another embodiment, verification module 630 includes a comparator 683 to compare authorization code(s) 620 to a stored list of authorization codes 625 accessible to an operational component 610 via verification module 630 or by a stored list 625 within an operational component 610. The comparator 683 and/or another element outside verification module 630 can be configured to generate an authorization code validation as well as to receive an indication from external control system 675 via input module 680 that authorization code(s) 620 are verified as valid.

In one embodiment, verification module 630 is configured for verifying authorization code(s) 620 that include data concerning copyright protection of the object data files) 640. For example, object data file(s) 640 can include reproducible object files to enable an operational component 610 to implement (e.g. reify) an operational output (see 650, 652, 654). In another embodiment, verification module 630 operates to verify authorization code(s) 620 wherein the authorization code is associated with a pre-condition that may include a licensing status associated with the one or more objects and/or object data file.

The licensing status may ins some embodiments be indicative of one or more of a royalty status, an expiration date pertaining to a license, and/or a number of manufacturing runs permitted according to the license, as well as other pertinent licensing requirements 672. In one embodiment the license information including licensing requirements 672 can be accessed locally by security control system 600, or in some instances from an outside source via input module 680.

In another embodiment, verification module 630 is configured for verifying authorization code(s) 620 to determine a payment status and/or an authorization status under a permission agreement 674. The permission agreement 674 can include an intellectual property licensing agreement, a private party ownership agreement, or any other agreement associated with creating, producing, duplicating, processing, or testing objects to implement an exemplary functional operation involving one or more output objects 650, output data 652 and/or output result 654. In one embodiment the permission agreement 674 that includes various predetermined conditions can be accessed locally by security control system 600, or in some instances from an outside source via input module 680.

FIG. 6 further illustrates various embodiments of a security control system 600 that can include one or more an operational components 610 having security control features to enable or prevent various exemplary functional operations that may include two-dimensional manufacturing techniques, three-dimensional manufacturing techniques, additive manufacturing units, and/or subtractive manufacturing using exemplary industrial or commercial production methods and/or operational components shown as production device 684, testing device 685, creative tool 686, duplication unit 687, packaging assembly 688, chemical process 689, injection molding unit 690, subtraction machine 691, stamping machine 692, extrusion machine 693, melting machine 694, die-casting machine 695, solidifying machine 696, customized manufacturing machine 697, rapid prototyping device 698, and robotic manufacturing line 699.

An operational component 610 can, in one embodiment, interact with verification module 630 to enable or prevent functioning of a physical aspect of an operational component 610 (e.g., one or more of the illustrated operational components 684-699) if the authorization code(s) 620 meet one or more predetermined conditions, such as a code that cryptographically interacts with an operational component 610 to produce a binary output to a switch or the like. In another embodiment, verification module 630 can prevent or enable a read function in one or more of verification module 630 and/or an operational component 610 if the authorization code(s) 620 is accepted from external control system 675 via input module 680 or is validated locally by verification module 630.

In a further embodiment, verification module 630 is configured for enabling or disabling an operational component 610 dependent on one or more predetermined conditions. Examples of such predetermined conditions (e.g., licensing restrictions 672, permission agreement 674) applicable to one or more of the operational components 610 may include but are not limited to one or more of the following: benchmark comparison, temporal milestone, time period restriction, production quantity limitation, production machine qualification, operator qualification, event occurrence, and quality certification.

In another embodiment, verification module 630 enables (or in some instances prevents) object data file(s) 640 to become readable by an operational component 610 if the authorization code(s) 620 passes a compare function performed by comparator 683 associated with a machine identifier passed to comparator 683 from an operational component 610.

Figure 7A:
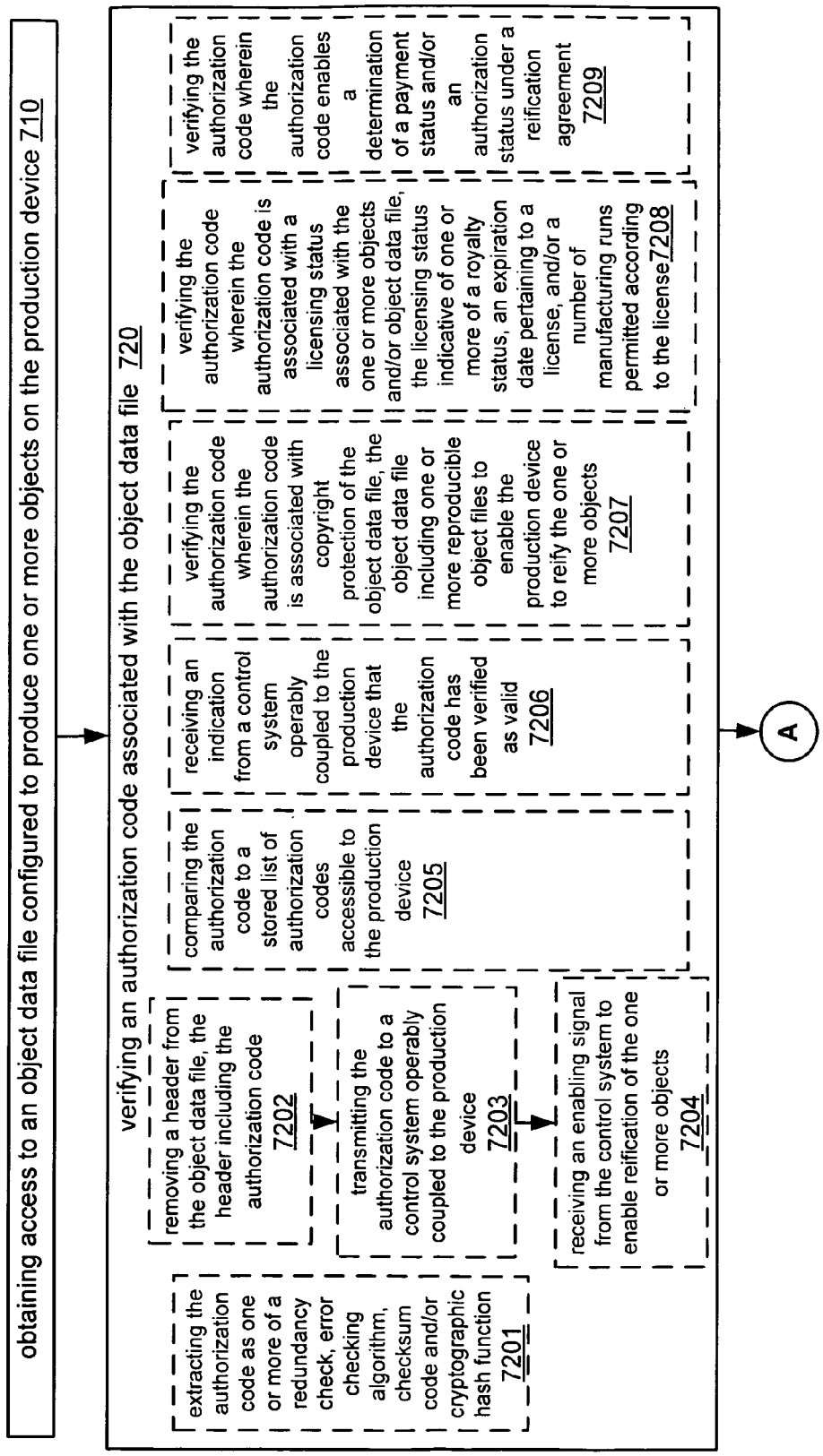

Referring now to FIGS. 7A, 7B, 7C, and 7D, a flow diagram illustrates a method in accordance with various embodiments for a security-activated operational component. FIG. 7A illustrates block 710, which provides for obtaining access to an object data file configured to produce one or more objects by an operational component (e.g., an operational component 610, security control system 600, or an application 679 or the like accessing object data file(s) 640). Block 720 provides for verifying an authorization code associated with the object data file (e.g., verification module 630 verifying authorization code(s) 620 associated with object data file(s) 640).

Disposed within block 720 is optional block 7201, which provides for extracting the authorization code as one or more of a redundancy check, error checking algorithm, checksum code and/or cryptographic hash function (e.g., verification module 630 extracting authorization code(s) 620 wherein authorization code(s) 620 are checksum codes and/or cryptographic hash functions). Also disposed within block 720 is optional block 7202, which provides for removing a header from the object data file, the header including the authorization code (e.g., verification module 630 removing a header from object data file(s) 640 wherein the header includes authorization code(s) 620). Following optional block 7202 is optional block 7203 which provides for transmitting the authorization code to a control system operably coupled to the operational component (e.g., transceiver 670 transmitting authorization code(s) 620 to or from external control system 675 coupled to operational component 610). Following optional block 7203 is optional block 7204 which provides for receiving an enabling signal from the control system to enable reification of the one or more objects (e.g., external control system 675 or security control system 600 sending an enabling signal or disabling signal to enable or prevent reification of output objects 650).

Also included in block 720 is optional block 7205 which provides for comparing the authorization code to a stored list of authorization codes accessible to the an operational component (e.g., comparator 683 comparing authorization code(s) 620 to stored list 625 of authorization codes accessible to an operational component 610).

Also included in block 720 is optional block 7206 which provides for receiving an indication from a control system operably coupled to the an operational component that the authorization code has been verified as valid (e.g., transceiver 670 receiving an indication from external control system 675 coupled to an operational component 610 that authorization code(s) 620 are verified as valid). Also included in block 720 is optional block 7207 which provides for verifying the authorization code wherein the authorization code is associated with copyright protection of the object data file, the object data file including one or more reproducible object files to enable the an operational component to implement a function (e.g., reify) regarding the one or more objects.

Also included in block 720 is optional block 7208 which provides for verifying the authorization code wherein the authorization code is associated with a licensing status associated with the one or more objects and/or object data file, the licensing status including licensing restrictions 672 indicative of one or more of a royalty status, an expiration date pertaining to a license, and/or a number of manufacturing runs permitted according to the license (e.g., verification module 630 verifying authorization code(s) 620 associated with a licensing status associated with objects 650 and/or object data file(s) 640, the licensing status indicating a royalty status, an expiration date for the license and/or a number of manufacturing runs under the license).

Also disposed in block 720 is optional block 7209 which provides for verifying the authorization code wherein the authorization code enables a determination of an applicable pre-condition such as payment status and/or an authorization status under a reification agreement (e.g., verification module 630 verifying authorization code(s) 620, wherein the authorization code(s) 620 enables a determination of a payment status and/or an authorization status under a permission agreement 674 to reify objects 650 described by an object data file(s) 640).

Figure 7B:
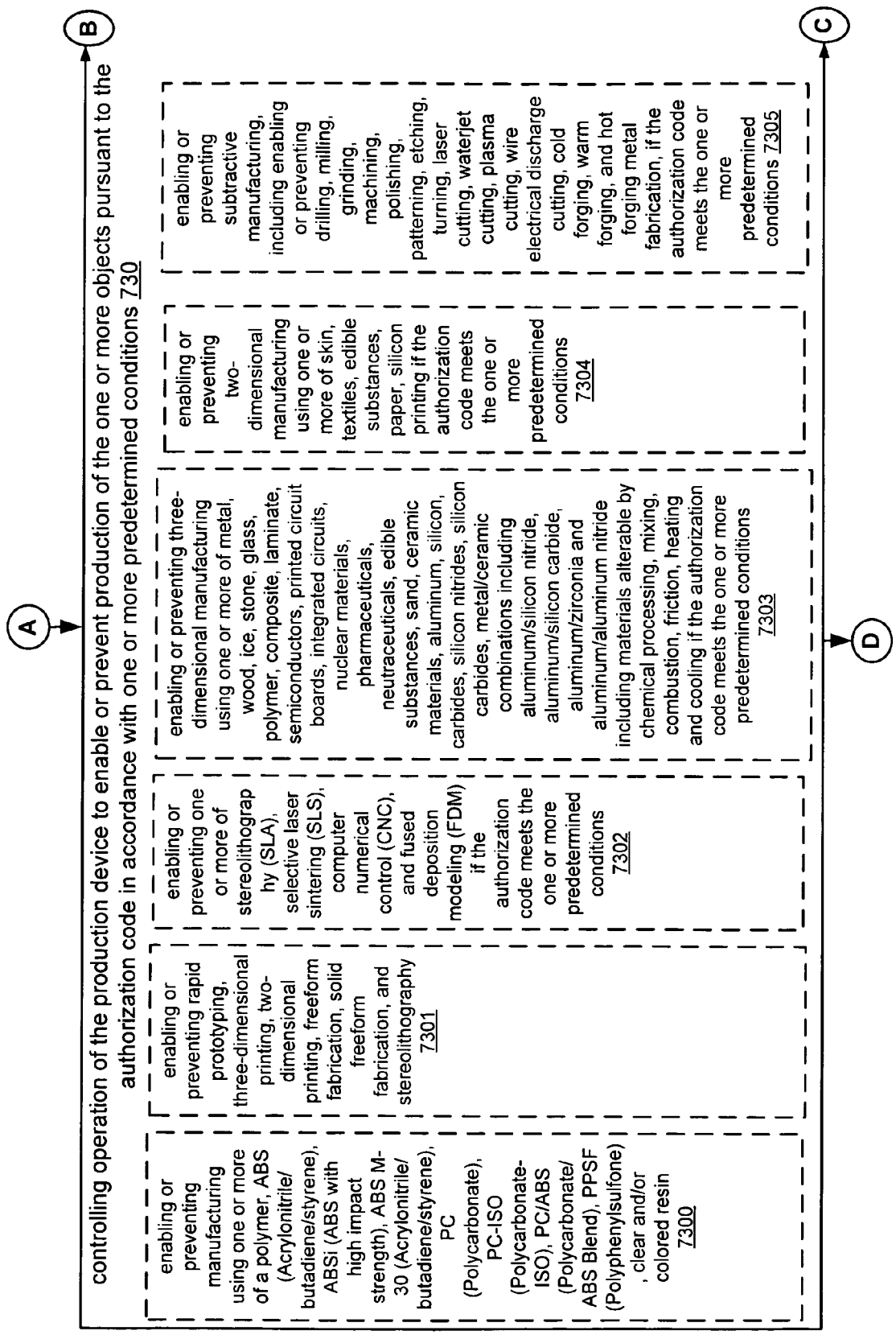

The method continues in FIG. 7B illustrating block 730, which provides for controlling operation of the an operational component to enable or prevent an operational function regarding the one or more objects pursuant to the authorization code in accordance with one or more predetermined conditions (e.g., verification module 630 interacting with an operational component 610 to enable or prevent an operational function regarding output objects 650 or output data 652 or output result 654 in accordance with licensing restrictions 672 and/or permission agreement 674).

Disposed within block 730 is shown optional block 7300 which provides for enabling or preventing manufacturing using one or more of a polymer, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g. verification module 630 enabling or preventing manufacturing using one or more of a polymer, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin).

Also disposed within block 730 is optional block 7301 which provides for enabling or preventing rapid prototyping, three-dimensional printing, two-dimensional printing, freeform fabrication, solid freeform fabrication, and stereolithography (e.g., verification module 630 enabling or preventing rapid prototyping, three-dimensional printing, two-dimensional printing, freeform fabrication, solid freeform fabrication, and stereolithography in production embodiments 684-699).

Also disposed within block 730 is optional block 7302, which provides for enabling or preventing one or more of stereolithography (SLA), selective laser sintering (SLS), computer numerical control (CNC), and fused deposition modeling (FDM) if the authorization code meets the one or more predetermined conditions (e.g. verification module 630 enabling or preventing according to authorization code(s) 620 stereolithography (SLA), selective laser sintering (SLS), computer numerical control (CNC), and fused deposition modeling (FDM) in manufacturing production embodiments 684-699).

Also disposed within block 730 is optional block 7303, which provides for enabling or preventing three-dimensional manufacturing using one or more of metal, wood, ice, stone, glass, polymer, composite, laminate, semiconductors, printed circuit boards, integrated circuits, nuclear materials, pharmaceuticals, neutraceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by chemical processing, mixing, combustion, friction, heating and cooling if the authorization code meets the one or more predetermined conditions (e.g., verification module 630 enabling or preventing three-dimensional manufacturing and the like if authorization code(s) 620 meet predetermined conditions).

Also disposed within block 730 is optional block 7304, which provides for enabling or preventing two-dimensional manufacturing using one or more of skin, textiles, edible substances, paper, silicon printing if the authorization code meets the one or more predetermined conditions (e.g., verification module 630 enabling or preventing two-dimensional manufacturing and the like according to predetermined conditions met or not met by authorization code(s) 620).

Also disposed within block 730 is optional block 7305, which provides for enabling or preventing subtractive manufacturing, including enabling or preventing drilling, milling, grinding, machining, polishing, patterning, etching, turning, laser cutting, waterjet cutting, plasma cutting, wire electrical discharge cutting, cold forging, warm forging, and hot forging metal fabrication, if the authorization code meets the one or more predetermined conditions (e.g., verification module 630 enabling or preventing subtractive and/or additive type manufacturing in production embodiments 684-699).

Figure 7C:
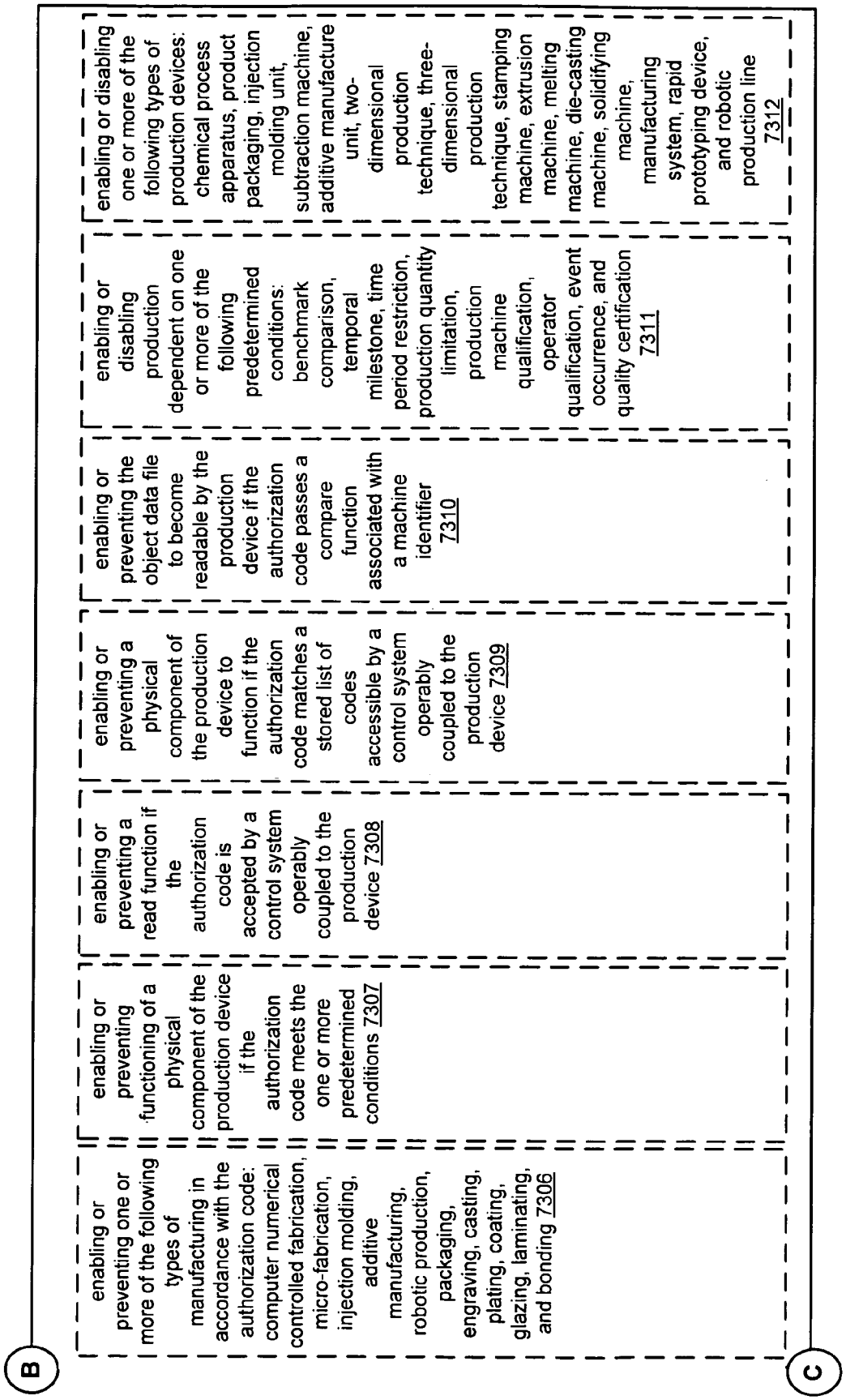

Block 730 continues in FIG. 7C illustrating optional block 7306 within block 730, which provides for enabling or preventing one or more of the following types of manufacturing in accordance with the authorization code: computer numerical controlled fabrication, micro-fabrication, injection molding, additive manufacturing, robotic production, packaging, engraving, casting, plating, coating, glazing, laminating, and bonding (e.g., verification module 630 enabling or preventing manufacturing production embodiments 684-699 in accordance with authorization code(2) 620).

Block 730 further includes optional block 7307, which provides for enabling or preventing functioning of a physical aspect of the an operational component if the authorization code meets the one or more predetermined conditions (e.g., verification module 630 enabling or preventing functions of an aspect of an operational component 610 if authorization code(s) 620 meet predetermined conditions).

Block 730 further includes optional block 7308, which provides for enabling or preventing a read function if the authorization code is accepted by a control system operably coupled to the operational component (e.g., verification module 630 enabling or preventing a read function to enable reading object data file(s) 640 if authorization code(s) 620 are approved by external control system 675 coupled to operational component 610).

Block 730 further includes optional block 7309 which provides for enabling or preventing a physical aspect of the operational component to function if the authorization code matches a stored list of codes accessible by a control system operably coupled to the operational component (e.g., verification module 630 enabling or preventing a physical aspect of operational component 610 to function if authorization code(s) 620 matches a one or more codes in a stored list of codes 625 accessible by external control system 675 or security control system 600 coupled to operational component 610).

Further disposed within block 730 is optional block 7310 which provides for enabling or preventing the object data file to become readable by the operational component if the authorization code passes a compare function associated with a machine identifier (e.g., verification module 630 enabling or preventing readability of object data file(s) 640 by operational component 610 if authorization code(s) 620 passes a comparison function via comparator 683 with a machine identifier).

Further disposed within block 730 is optional block 7311, which provides for enabling or disabling an operational function dependent on one or more of the following predetermined conditions: benchmark comparison, temporal milestone, time period restriction, production quantity limitation, production machine qualification, operator qualification, event occurrence, and quality certification (e.g., enabling or disabling production embodiments 684-699 in accordance with predetermined conditions such as licensing restrictions 672 or permission agreement 674).

Further disposed within block 730 is optional block 7312, which provides for enabling or disabling one or more of the following types of operational components: chemical process apparatus, product packaging, injection molding unit, subtraction machine, additive manufacture unit, two-dimensional production technique, three-dimensional production technique, stamping machine, extrusion machine, melting machine, die-casting machine, solidifying machine, manufacturing system, rapid prototyping device, and robotic production line (e.g., enabling or disabling operational components and processes 684-699).

Referring now to FIG. 7D, the method continues with block 740, which provides for receiving the object data file at a buffer for the operational component (e.g., transceiver 670 receiving object data file(s) 640 at buffer 660 for operational component 610). Block 750 provides for sending an acknowledgment that the object data file was received by the operational component to a source of the object data file (e.g., transceiver 670 sending an acknowledgement that object data file(s) 640 was received by operational component 610 to a source of object data file(s) 640).

Block 760 provides for processing the object data file in the buffer to verify a request to instantiate the object data file (e.g., verification module 630 processing object data file(s) 640 in buffer 660 to verify a request to instantiate object data file(s) 640).

Block 770 provides for receiving the authorization code at a buffer, the buffer configured to notify an application if the object data file is loaded in the buffer, the object data file including one or more of a production model file and/or a computer-aided design (CAD) solid model file and/or a computer-aided manufacturing (CAM) file (e.g., buffer 660 receiving authorization code(s) 620, buffer 660 then notifying an application 679 that object data file(s) 640 is loaded). Disposed within block 770 is optional block 7702, which provides for extracting the authorization code from the object data file in the buffer, the authorization code required to enable the operational component to acknowledge the object data file as a valid file (e.g., buffer 660 extracting authorization code(s) 620 to enable operational component 610 to acknowledge object data file(s) 640 as a valid file).

Figure 8:
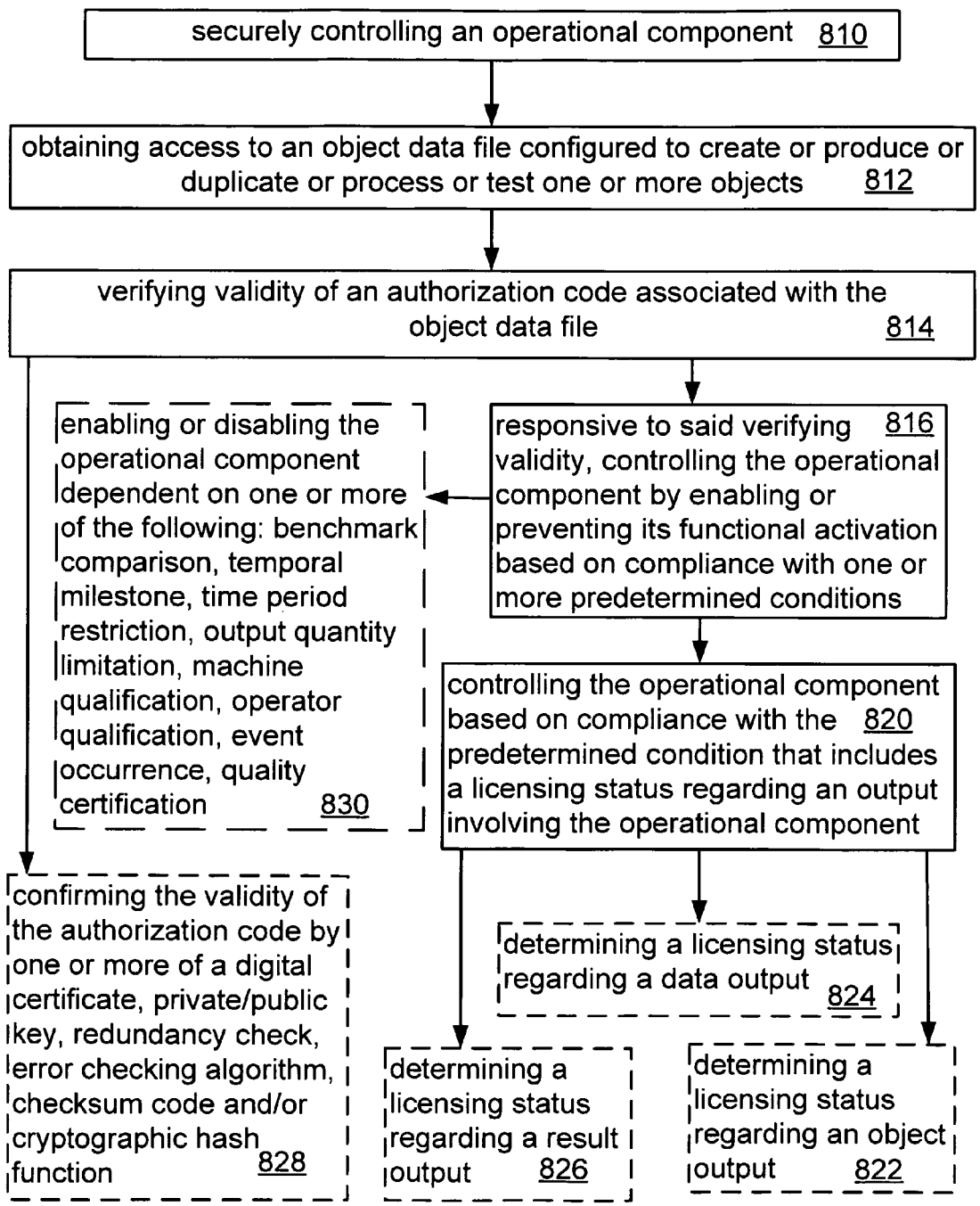
FIG. 8 illustrates a flow diagram of exemplary method features in accordance with additional embodiments of the subject matter of the present application.

Referring now to FIG. 8, a flow diagram illustrates a method in accordance with various embodiments for securely controlling an operational component (block 810). Another possible feature shown in block 812 includes obtaining access to an object data file configured to create or produce or duplicate or process or test one or more objects (e.g., an operational component 610 accessing an object data file 640). Further method features may include verifying validity of an authorization code associated with the object data file as shown in block 814 (e.g., verification module 630 confirming validity of authorization code 620 associated with an object data file 640); and responsive to said verifying validity, controlling the operational component by enabling or preventing its functional activation based on compliance with one or more predetermined conditions as shown in block 816 (e.g., verification module 630 accessing pre-conditions of licensing restriction 672 and/or permission agreement 674 before allowing activation of operational component 610).

A further method feature shown in block 828 may include confirming the validity of the authorization code by one or more of a digital certificate, private/public key, redundancy check, error checking algorithm, checksum code and/or cryptographic hash function (e.g., verification module 630 obtaining authorization code 620 with associated security features)

Yet another exemplary feature shown in block 820 may provide controlling the operational component based on compliance with the predetermined condition that includes a licensing status regarding an output involving the operational component. Related aspects are shown in optional block 822 which provides for determining a licensing status regarding an object output, and in block 824 which provides for determining a licensing status regarding a data output, and in block 826 which provides for determining a licensing status regarding a result output. An additional exemplary feature shown in block 830 provides for enabling or disabling the operational component dependent on one or more of the following predetermined conditions: benchmark comparison, temporal milestone, time period restriction, output quantity limitation, machine qualification, operator qualification, event occurrence, and quality certification. (e.g., verification module 630 confirming applicable preconditions 672, 674 associated with a machine identifier for operational component 610).

As disclosed herein, the exemplary system, apparatus and computer program product embodiments shown in FIGS. 1-2, 4, and 6 along with other components, devices know-how, skill and techniques that are known in the art have the capability of implementing and practicing the methods and processes shown in FIGS. 3A-3D, 5A-5C, 7A-7D, and 8. However, it is to be further understood by those skilled in the art that other systems, apparatus and technology may be used to implement and practice such methods and processes.

It will also be understood that the various methods and systems disclosed herein include exemplary implementations for a security-activated operational component. Possible embodiments include but are not limited to obtaining access to an object data file configured to implement various functional operation regarding one or more objects; verifying validity of an authorization code associated with the object data file; and controlling operation of the operational component to enable or prevent its activation pursuant to the authorization code in accordance with one or more predetermined conditions.

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for securely controlling an operational component, comprising:
receiving, via a computing device, an object data file specifying one or more operational component functions for at least one of creating, producing, duplicating, processing or testing one or more objects and including an authorization code associated with digital rights management of the object data file;
retrieving, via a computing device, the authorization code from the object data file;
verifying, via a computing device, compliance of the authorization code with one or more predetermined conditions,
wherein the verifying occurs at least partially prior to at least one of creating, producing, duplicating, processing or testing one or more objects as specified by the object data file; and
controlling, via a controller device, the operational component at least partially in response to a verification of compliance of the authorization code with the one or more predetermined conditions.

2. The method of claim 1, wherein the receiving, via a computing device, an object data file specifying one or more operational component functions for at least one of creating, producing, duplicating, processing or testing one or more objects and including an authorization code associated with digital rights management of the object data file further comprising:
receiving the object data file at a buffer for the operational component;
sending to a source of the object data file an acknowledgment that the object data file was received by the operational component.

3. The method of claim 1 wherein the receiving, via a computing device, an object data file specifying one or more operational component functions for at least one of creating, producing, duplicating, processing or testing one or more objects and including an authorization code associated with digital rights management of the object data file includes:
receiving an object data file that includes one or more of operational instructions and/or a production model file and/or a computer-aided design (CAD) solid model file and/or a computer-aided manufacturing (CAM) file.

4. The method of claim 1 wherein the verifying, via a computing device, compliance of the authorization code with one or more predetermined conditions includes:
confirming a validity of the authorization code by one or more of a digital certificate, private/public key, redundancy check, error checking algorithm, checksum code and/or cryptographic hash function.

5. The method of claim 1 wherein the retrieving, via a computing device, the authorization code from the object data file includes:
removing a header from the object data file, the header including the authorization code; and
transmitting the authorization code to a security control system operably coupled to the operational component.

6. The method of claim 5, wherein the controlling, via a controller device, the operational component at least partially in response to compliance of the authorization code with the one or more predetermined conditions includes:
enabling activation of the operational component upon receipt of an authorization status signal from the security control system.

7. The method of claim 5, wherein the controlling, via a controller device, the operational component at least partially in response to compliance of the authorization code with the one or more predetermined conditions includes:
preventing activation of the operational component upon receipt of an authorization status signal from the security control system.

8. The method of claim 1 wherein the verifying, via a computing device, compliance of the authorization code with one or more predetermined conditions includes:
comparing the authorization code to a stored list of authorization codes.

9. The method of claim 1 wherein the verifying, via a computing device, compliance of the authorization code with one or more predetermined conditions includes:
verifying compliance of the authorization code with copyright protection of the object data file.

10. The method of claim 1 wherein the controlling, via a controller device, the operational component at least partially in response to compliance of the authorization code with the one or more predetermined conditions includes:
controlling the operational component based on compliance with at least one predetermined condition that includes a licensing status regarding an object to be created, produced, duplicated, processed or tested by the operational component.

11. The method of claim 1 wherein the controlling, via a controller device, the operational component at least partially in response to compliance of the authorization code with the one or more predetermined conditions includes:
controlling the operational component based on compliance with a predetermined condition that includes a licensing status regarding a data output involving the operational component.

12. The method of claim 1 wherein the controlling, via a controller device, the operational component at least partially in response to compliance of the authorization code with the one or more predetermined conditions includes:
controlling the operational component based on compliance with a predetermined condition that includes a licensing status regarding a result output involving the operational component.

13. The method of claim 1 The method of claim 1 wherein the controlling, via a controller device, the operational component at least partially in response to compliance of the authorization code with the one or more predetermined conditions includes:
enabling or preventing a manufacturing operation using one or more polymer materials.

14. The method of claim 1 wherein the controlling, via a controller device, the operational component at least partially in response to compliance of the authorization code with the one or more predetermined conditions includes:
enabling or preventing a production operation involving one or more of the following: rapid prototyping, additive manufacturing, subtractive manufacturing, three-dimensional manufacturing or printing, two-dimensional manufacturing or printing, freeform fabrication, and stereolithography.

15. The method of claim 1 wherein the controlling, via a controller device, the operational component at least partially in response to compliance of the authorization code with the one or more predetermined conditions includes:
enabling or preventing functioning of a physical aspect of the operational component based on compliance with the one or more predetermined conditions.

16. The method of claim 1 wherein the controlling, via a controller device, the operational component at least partially in response to compliance of the authorization code with the one or more predetermined conditions includes:
enabling or preventing a read function of the object data file based on compliance with the one or more predetermined conditions.

17. The method of claim 1 wherein the controlling, via a controller device, the operational component at least partially in response to compliance of the authorization code with the one or more predetermined conditions includes:
enabling or disabling one or more of the following types of operational components:
production device, testing device, creative tool, duplication unit, packaging assembly, chemical process apparatus, injection molding unit, subtraction machine, stamping machine, extrusion machine, melting machine, die-casting machine, solidifying machine, custom manufacturing, rapid prototyping device, and robotic manufacturing line.

18. A computer program product comprising a non-transitory computer readable medium configured to perform one or more acts for securely controlling an operational component, the one or more acts comprising:

one or more instructions for receiving an object data file specifying one or more operational component functions for at least one of creating, producing, duplicating, processing or testing one or more objects and including an authorization code associated with digital rights management of the object data file;

one or more instructions for retrieving, via a computing device, the authorization code from the object data file;

one or more instructions for verifying compliance of the authorization code with one or more predetermined conditions, wherein the verifying occurs at least partially prior to at least one of creating, producing, duplicating, processing or testing one or more objects as specified by the object data file; and one or more instructions for controlling the operational component at least partially in response to a verification of compliance of the authorization code with the one or more predetermined conditions.

19. The computer program product of claim 18 wherein the one or more instructions for verifying compliance of the authorization code with one or more predetermined conditions includes:

one or more instructions for confirming validity of the authorization code by one or more of a digital certificate, private/public key, redundancy check, error checking algorithm, checksum code and/or cryptographic hash function.

20. The computer program product of claim 18 wherein the one or more instructions for the verifying compliance of the authorization code with one or more predetermined conditions includes:

one or more instructions for comparing the authorization code to a stored list of authorization codes accessible to the operational component.

21. The computer program product of claim 18 wherein the one or more instructions for controlling the operational component in response to a verification of compliance of the authorization code with the one or more predetermined conditions includes:

one or more instructions for controlling the operational component based on compliance with at least one predetermined condition that includes a licensing status indicative of one or more of a royalty status, an expiration date pertaining to a license, and/or a number of manufacturing runs permitted according to the license.

22. The computer program product of claim 18 wherein the one or more instructions for controlling the operational component at least partially in response to a verification of compliance of the authorization code with the one or more predetermined conditions includes:

one or more instructions for enabling or preventing a physical aspect of the operational component to function if the authorization code matches a stored list of codes accessible by a control system operably coupled to the operational component.

23. The computer program product of claim 18 wherein the one or more instructions for controlling the operational component at least partially in response to a verification of compliance of the authorization code with the one or more predetermined conditions includes:

one or more instructions for enabling or preventing the object data file to become readable by the operational component if the authorization code passes a compare function associated with a machine identifier.

24. The computer program product of claim 18 wherein the one or more instructions for the controlling the operational component at least partially in response to a verification of compliance of the authorization code with the one or more predetermined conditions includes:

one or more instructions for enabling or disabling the operational component dependent on one or more of the following predetermined conditions: benchmark comparison, temporal milestone, time period restriction, output quantity limitation, machine qualification, operator qualification, event occurrence, and quality certification.

25. The computer program product of claim 18 wherein the one or more instructions for controlling the operational component at least partially in response to a verification of compliance of the authorization code with the one or more predetermined conditions includes:

one or more instructions for enabling or disabling one or more of the following types of operational components: production device, testing device, creative tool, duplication unit, packaging assembly, chemical process apparatus, injection molding unit, subtraction machine, stamping machine, extrusion machine, melting machine, die-casting machine, solidifying machine, custom manufacturing, rapid prototyping device, and robotic manufacturing line.

26. A security system for one or more operational components comprising:

means for receiving an object data file specifying one or more operational component functions for at least one of creating, producing, duplicating, processing or testing one or more objects and including an authorization code associated with digital rights management of the object data file;

means for retrieving the authorization code from the object data file;

means for verifying compliance of the authorization code associated with an object data file with one or more predetermined conditions, wherein the verifying occurs prior to at least one of creating, producing, duplicating, processing or testing the one or more objects as specified by the object data file;

means for controlling the operational component at least partially in response to a verification of compliance of the authorization code with the one or more predetermined conditions.

27. The security system of claim 26 wherein the object data file is one or more of operational instructions, and/or a production model file and/or a computer-aided design (CAD) solid model file and/or a computer-aided manufacturing (CAM) file.

28. The security system of claim 26 wherein the means for retrieving the authorization code from the object data file is configured to extract the authorization code from the object data file, the authorization code configured to enable the operational component to acknowledge the object data file as a valid file.

29. The security system of claim 26 wherein the means for verifying compliance of an authorization code associated with an object data file with one or more predetermined conditions is configured for validating the authorization code based on one or more of a digital certificate, private/public key, redundancy check, error checking algorithm, checksum code and/or cryptographic hash function.

30. The security system of claim 26 wherein the means for retrieving the authorization code from the object data file includes:

a parser configured for removing a header from the object data file, the header including the authorization code; and a transceiver configured for transmitting the authorization code to a control system operably coupled to the operational component and/or configured for receiving an enabling signal from the control system to activate the operational component.

31. The security system of claim 26 wherein the means for verifying compliance of an authorization code associated with an object data file with one or more predetermined conditions includes a comparator, the comparator configured for comparing the authorization code to a stored list of authorization codes accessible to the operational component.

32. The security system of claim 26 wherein the means for verifying compliance of an authorization code associated with an object data file with one or more predetermined conditions is configured for receiving an indication from a control system operably coupled to the operational component that the authorization code has been verified as valid.

33. The security system of claim 26 wherein the means for verifying compliance of an authorization code associated with an object data file with one or more predetermined conditions is configured for verifying the authorization code wherein the authorization code is associated with copyright protection of the object data file, the object data file including one or more reproducible object files to activate the operational component.

34. The security system of claim 26 wherein the means for verifying compliance of an authorization code associated with an object data file with one or more predetermined conditions is configured for verifying the authorization code associated with a licensing status regarding the object and/or regarding the object data file, the licensing status indicative of one or more of a royalty, an expiration date, an operational restriction, and/or a permitted number of manufacturing runs.

35. The security system of claim 26 wherein the means for verifying compliance of an authorization code associated with an object data file with one or more predetermined conditions is configured for verifying the authorization code wherein the authorization code enables a determination of a payment status and/or an authorization status under an operational permission agreement.

36. The security system of claim 26 wherein the means for controlling the operational component by enabling or disabling its functional activation is configured for enabling or preventing manufacturing that uses one or more of a polymer, ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

37. The security system of claim 26 wherein the means for controlling the operational component at least partially in response to a verification of compliance of the authorization code with the one or more predetermined conditions is configured for enabling or preventing one or more of stereolithography (SLA), selective laser sintering (SLS), computer numerical control (CNC), and fused deposition modeling (FDM) if the authorization code meets the one or more pre- conditions.

38. The security system of claim 26 wherein means for controlling the operational component at least partially in response to a verification of compliance of the authorization code with the one or more predetermined conditions is configured for enabling or preventing three-dimensional manufacturing that uses one or more of metal, wood, ice, stone, glass, polymer, composite, laminate, semiconductors, printed circuit boards, integrated circuits, nuclear materials, pharmaceuticals, neutraceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by chemical processing, mixing, combustion, friction, heating and cooling if the authorization code meets the one or more pre-conditions.

39. The security system of claim 26 wherein means for controlling the operational at least partially in response to a verification of compliance of the authorization code with the one or more predetermined conditions is configured for enabling or preventing two-dimensional manufacturing that uses one or more of skin, textiles, edible substances, paper, silicon printing if the authorization code meets the one or more pre-conditions.

40. The security system of claim 26 wherein means for controlling the operational component at least partially in response to a verification of compliance of the authorization code with the one or more predetermined conditions is configured for enabling or preventing subtractive manufacturing, including enabling or preventing drilling, milling, grinding, machining, polishing, patterning, etching, turning, laser cutting, waterjet cutting, plasma cutting, wire electrical discharge cutting, cold forging, warm forging, and hot forging metal fabrication, if the authorization code meets the one or more pre-conditions.

41. The security system of claim 26 wherein the means for controlling the operational component at least partially in response to a verification of compliance of the authorization code with the one or more predetermined conditions is configured for enabling or preventing one or more of the following types of manufacturing in accordance with the authorization code: computer numerical controlled fabrication, microfabrication, injection molding, additive manufacturing, robotic production, packaging, engraving, casting, plating, coating, glazing, laminating, and bonding.

42. The security system of claim 26 wherein means for controlling the operational component at least partially in response to a verification of compliance of the authorization code with the one or more predetermined conditions is configured for enabling or preventing functioning of a physical aspect of the operational component if the authorization code meets the one or more predetermined conditions.

43. The security system of claim 26 wherein the means for controlling the operational component at least partially in response to a verification of compliance of the authorization code with the one or more predetermined conditions is configured for enabling or preventing a read function if the authorization code is accepted by a control system operably coupled to the operational component.

44. The security system of claim 26 wherein means for controlling the operational component at least partially in response to a verification of compliance of the authorization code with the one or more predetermined conditions is configured for enabling or preventing a physical aspect of the operational component to function dependent on a matching comparison of the authorization code with a stored list of codes accessible by a control system operably coupled to the operational device.

45. The security system of claim 26 wherein means for controlling the operational component at least partially in response to a verification of compliance of the authorization code with the one or more predetermined conditions is configured for enabling or preventing the object data file to become readable by the operational component if the authorization code passes a compare function associated with a machine identifier.

46. The security system of claim 26 wherein the means for controlling the operational component at least partially in response to a verification of compliance of the authorization code with the one or more predetermined conditions is configured for enabling or disabling the operational component dependent on one or more of the following predetermined conditions: benchmark comparison, temporal milestone, time period restriction, output quantity limitation, machine qualification, operator qualification, event occurrence, and quality certification.

47. The security system of claim 26 wherein the means for controlling the operational component at least partially in response to a verification of compliance of the authorization code with the one or more predetermined conditions is configured for enabling or disabling one or more of the following types of production devices: chemical process apparatus, product packaging, injection molding unit, subtraction machine, additive manufacture unit, two-dimensional production technique, three-dimensional production technique, stamping machine, extrusion machine, melting machine, die-casting machine, solidifying machine, manufacturing system, rapid prototyping device, and robotic production line.

* * * * *

UNITED STATES PATENT AND TRADEMARK OFFICE
CERTIFICATE OF CORRECTION

| | | |
|---|---|---|
| PATENT NO. | : 8,752,166 B2 | Page 1 of 1 |
| APPLICATION NO. | : 12/287704 | |
| DATED | : June 10, 2014 | |
| INVENTOR(S) | : Jung et al. | |

It is certified that error appears in the above-identified patent and that said Letters Patent is hereby corrected as shown below:

In the Claims:

In Column 26, Claim 13, Line 22 please delete text "The method of claim 1 The method of claim 1 wherein" and replace with --The method of claim 1 wherein--

Signed and Sealed this
Twenty-third Day of September, 2014

Michelle K. Lee
*Deputy Director of the United States Patent and Trademark Office*